United States Patent [19]
Nishijima et al.

[11] Patent Number: 5,497,279
[45] Date of Patent: Mar. 5, 1996

[54] TAPE CARTRIDGE AND RECORDING REPRODUCTION APPARATUS FOR THE TAPE CARTRIDGE

[75] Inventors: Tatsumi Nishijima; Hidekazu Takeda, both of Hiratsuka; Kenmei Masuda, Yokohama; Hikaru Mizutani, Minoo; Yoshimi Maehara, Otsu; Kenji Ogiro, Yokohama, all of Japan

[73] Assignees: Hitachi, Ltd., Tokyo; Hitachi Maxell Ltd., Osaka, both of Japan

[21] Appl. No.: 226,263

[22] Filed: Apr. 8, 1994

[30] Foreign Application Priority Data

| Apr. 16, 1993 | [JP] | Japan | 5-089687 |
| May 31, 1993 | [JP] | Japan | 5-154268 |
| May 27, 1993 | [JP] | Japan | 5-151456 |

[51] Int. Cl.⁶ .................... G11B 15/60; G11B 23/08; G03B 23/02
[52] U.S. Cl. .................... 360/96.5; 360/132; 242/347.1
[58] Field of Search .................... 360/93, 96.5, 96.6, 360/99.02, 99.06, 132; 242/347.1

[56] References Cited

U.S. PATENT DOCUMENTS

| 3,900,171 | 8/1975 | Serizawa | 242/338.4 |
| 4,796,117 | 1/1989 | Fleck | 360/96.5 |
| 4,811,138 | 3/1989 | Park | 360/96.5 |
| 4,870,517 | 9/1989 | Maehara et al. | 360/96.5 |
| 5,249,088 | 9/1993 | Matsuda et al. | 360/96.5 |
| 5,289,324 | 2/1994 | Katoku et al. | 360/96.5 |
| 5,291,352 | 3/1994 | Nagasawa | 360/96.5 |
| 5,291,354 | 3/1994 | Kim | 360/96.5 |
| 5,323,281 | 6/1994 | Park | 360/96.5 |

FOREIGN PATENT DOCUMENTS

| 0488599 | 11/1991 | European Pat. Off. . |
| 0573058 | 6/1993 | European Pat. Off. . |
| 2508223 | 6/1982 | France . |
| 58-60475 | 4/1983 | Japan . |
| 58-128069 | 7/1983 | Japan . |
| 60-163264 | 8/1985 | Japan . |
| 60-171684 | 9/1985 | Japan . |
| 61-210585 | 9/1986 | Japan . |
| 61-210587 | 9/1986 | Japan . |
| 2134485 | 12/1983 | United Kingdom . |

*Primary Examiner*—Stuart S. Levy
*Assistant Examiner*—Jefferson Evans
*Attorney, Agent, or Firm*—Antonelli, Terry, Stout & Kraus

[57] ABSTRACT

A tape cartridge is arranged so that when an upper lid of a pocket portion of the tape cartridge is in a position for opening the upper side of the pocket portion, the upper lid is positioned above an upper surface of a casing body so that a lower surface of the upper lid faces the upper surface of the casing body through a gap in which a member of a recording/reproduction apparatus for depressing the cartridge can be placed. When the upper lid is in the position for opening the upper side of the pocket, the cartridge depressing member of the recording/reproduction apparatus is placed in the gap to depress the cartridge, whereby the cartridge can be stably depressed to and mounted in a predetermined position in the recording/reproduction apparatus when the cartridge is loaded in the apparatus.

4 Claims, 15 Drawing Sheets

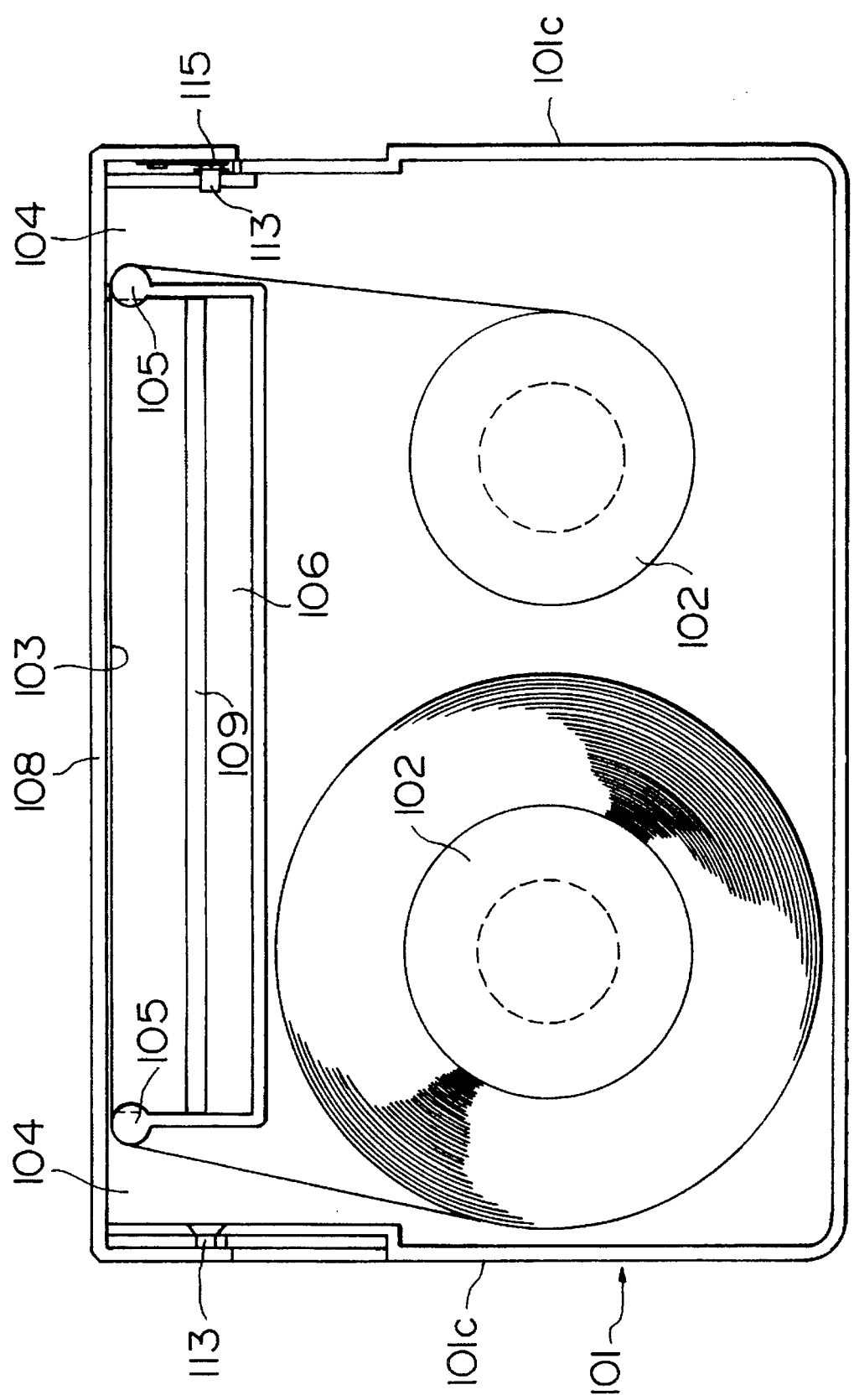

TAPE CARTRIDGE AND RECORDING REPRODUCTION APPARATUS FOR THE TAPE CARTRIDGE

BACKGROUND OF THE INVENTION

1. Field of the Invention

This invention relates to a tape cartridge and a recording/reproduction apparatus for the tape cartridge and, more particularly to, a small-scale tape cartridge having a two- or three-lids structure in which a pocket or mouth portion, for receiving a head of the recording/reproduction apparatus upon loading of the cartridge in the recording/reproduction apparatus, is formed in a front portion of a casing body of the tape cartridge, and in which a tape of the tape cartridge extending across the pocket portion is covered with the two or three lids when the cartridge is not loaded.

With respect to tape cartridges described in this specification, "front side" denotes a side of the tape cartridge facing the head, "upper side" denotes a side of the cartridge where the lids are positioned when opened, "transverse end", "side" and "left and/or right" correspond to an end portion or portions of the pocket portion located oppositely in a longitudinal direction of the tape extending in the pocket portion.

2. Description of Related Art

A conventional double-lid or two-lid structure of tape cartridges of the aforementioned type, e.g., an 8 mm video tape cartridge, as shown in FIG. 19, has a front lid 202 capable of opening and closing a front side of a pocket 201, and an inner lid or back or rear lid 205 capable of opening and closing a non-magnetic surface side of a magnetic tape 204 by moving along guide grooves 203 in side walls of the pocket 201. See, for example, Japanese Patent Unexamined Publication Nos. 58-128069, 61-210585 and 61-210587.

Further, in order to reduce the size of a recording/reproduction mechanism or apparatus for such a tape cartridge, a conventional cylinder/cartridge overlapping system, as shown in FIG. 20, includes a cylindrical head or cylinder, with the read/write head 206 of the recording/reproduction apparatus entering the pocket 201 of the cartridge at the time of cartridge loading. See, for example, Japanese Patent Laid-Open Publication Nos. 60-163264 and 60-171684.

In the last-mentioned construction, if the cylinder (cylinder drum) 206 is introduced deep into the pocket of the 8 mm video cartridge to an excessively large extent, there is a possibility that the cylinder 206 may interface with a part of the inner or back lid 205, for opening/closing the non-magnetic face side of the tape 204, as shown in FIG. 20.

Recently, various technologies have been developed to meet a demand for magnetic recording/reproduction apparatuses such as video cameras (VTRs, i.e., video tape recorders and/or players) smaller in size and weight. In general, the size of a VTR mechanism is determined by shapes of the cylinder and the tape cartridge (cassette). Accordingly, for reduction in the size of the mechanism, it is necessary to reduce the size(s) of the cylinder and/or the cartridge. Therefore, attempts have been made to reduce the diameter of the cylinder by increasing the rotational speed and/or increasing the tape winding angle and other measures and to develop a compact cassette (cartridge) having an external size smaller than that of the digital audio tape (DAT) cassette. It is desirable to solve beforehand the above-mentioned problem of contact or interference between the cylinder and the inner lid so as to enable use of such a new cartridge.

In a conventional tape cartridge as shown in FIGS. 19 and 20, the inner lid 205 having an upper lid portion 207 serving as an upper lid and a back lid portion 208 serving as a back lid is brought into substantial contact with an upper surface 210 of a cartridge casing body 209, when the inner lid 205 is in an open state shown in FIG. 20. Accordingly, a cartridge pressing portion 212 of the transport or transfer means 211, which moves the tape cartridge in a direction of the arrow A to a predetermined position in the recording/reproduction apparatus at the time of loading of the cartridge in the apparatus, presses the casing body 209 in the direction of the arrow A at a position thereof on the back or rear side (in a direction of the arrow B) of the inner lid 205 set in the open position.

However, it has been determined that there is a risk of failure to appropriately press the cartridge casing body 209 in the direction of the arrow A by such pressing if the cartridge is smaller.

Japanese Patent Examined Publication No. 63-16825 discloses a triple-lid type of tape cartridge in which, as shown in FIG. 21, front and back surfaces of a tape 204 are covered with a front lid 215 and a back lid 216 while an upper side of a pocket 201 is covered with an upper lid 217. The front lid 215 moves upwardly around pivot 218 to upwardly open relative to a casing body 209. The upper lid 217 is connected to the front lid 215 by connecting pins 219. The upper lid 217 is moved obliquely upwardly to move onto an upper surface 210 of the casing body 209 in response to the upward pivotal movement of the front lid 215. The back lid 216 is connected to the upper lid 217 by connecting pins 220. Slide pins 221 provided on lower wall portions of the back lid 216 are moved and guided along guide grooves 222 in side walls of the pocket 201. In the open state of the lids 215, 216, 217, the back lid 216 is moved above the pocket 201 to the upper surface 210 of the casing body 209 to be laid generally parallel to the upper surface 210.

In a structure having three members, i.e., front lid 215, back lid 216 and upper lid 217 pivotally connected to each other in this manner, the lids 215, 216, and 217 retract in such a manner so as to be laid upon each other in the open state. In this manner, the amount of forward projection of the cover lids 205 to 207 at the upper positions in the open state can be reduced. However, a front end 223 of the back lid 216 is positioned so as to cover an upper portion of the pocket 201. Therefore, a compact component arrangement cannot be adopted in which the magnetic head of the tape recording/reproduction apparatus is introduced deep into the pocket 201. Accordingly, the effect of reducing the overall size of the recording/reproduction apparatus is limited.

Also in the case of the conventional tape cartridge constructed as shown in FIG. 21, the upper lid 217 is brought into contact with the upper surface 210 of the casing body 209, and a cartridge pressing portion of a cartridge transport or transfer means should therefore be adapted to press the casing body 209 at the back or rear side, i.e., in the direction of the arrow B, of the upper lid 217 in the open state.

When the tape cartridge of FIG. 21 is in the lids-closing state, left and right side ends of the back lid 216 are supported at four points through the upper connecting pins 220 and the lower slide pins 221, where a wall portion 231 of the back lid 216 has a shape of longer dimension or size in the widthwise direction of the cartridge and shorter dimension or size in the direction of thickness of the cartridge.

Therefore, if an external force in the direction of the arrow C is applied to the back lid 216 so as to press the back lid 216 obliquely upwardly, for example, by an inadvertent operation of a user, the wall portion 231 of the back lid 216 is deformed in a flexural manner toward the front of the casing body 209, as indicated by an imaginary or double-dot-dash line in FIG. 22. In such a case, there is a possibility that the connecting pin(s) 220 will come off the associated pin hole(s) with the deformation of the lid wall 231.

To avoid such a situation, it has been considered to increase the axial length of the connecting pins 220 and the depth of the associated pin holes fitted around that connecting pins 220. In practice, however, the operation of assembling these components becomes difficult if an engagement structure having an increased fitting depth is adopted.

SUMMARY OF THE INVENTION

A first object of the present invention is to provide a tape cartridge capable of being stably loaded in a recording/reproduction apparatus.

A second object of the present invention is to provide a recording/reproduction apparatus capable of being stably loaded with a tape cartridge.

A third object of the present invention is to provide a tape cartridge having an upper lid designed so as to enable a cylindrical head or cylinder for head to be introduced deep into a pocket portion, and guide grooves for guiding the movement of the upper lid, with the tape cartridge having a dustproof structure so as to prevent dust from entering the guide grooves.

A fourth object of the present invention is to provide a tape cartridge arranged to enable a head to deeply enter a pocket portion by opening an upper side of the pocket portion in an opening state of lids.

A fifth object of the present invention is to provide a tape cartridge of a triple lid structure having front, back and upper lids and arranged to prevent connected portions of the back and upper lids from being accidentally disengaged.

To achieve the first object, according to the present invention, there is provided a tape cartridge comprising a casing body having, in a front portion thereof, a pocket for receiving a head of a tape recording/reproduction apparatus when the tape cartridge is loaded in the tape recording/reproduction apparatus, a front lid movably attached to the casing body so as to open and close a front side of the pocket, and an upper lid movably attached to the casing body so as to open and close an upper side of the pocket. When the upper lid is in an opening position for opening the upper side of the pocket, the upper lid is positioned above an upper surface of the casing body so that a lower surface of the upper lid faces the upper surface of the casing body through a gap therebetween allowing pressing means for depressing the cartridge to be placed therein.

In the tape cartridge in accordance with the present invention, when the upper lid is moved to the opening position at which it opens the upper side of the pocket, the upper lid is positioned above the upper surface of the casing body so that the lower surface of the upper lid faces the upper surface of the casing body through the gap. Therefore, the pressing means for depressing the cartridge can be placed in the gap to stably press or push and a front portion of the cartridge to set the cartridge to a predetermined position in the recording/reproduction apparatus, even if the front portion of the cartridge is liable to be caused to be lifted due to the operation of the front lid.

In a preferred embodiment of the tape cartridge of the invention, the gap is positioned at a front portion of the upper surface of the casing body. Preferably, the gap is positioned within a region corresponding to a front half of the upper surface of the casing body.

In a preferred embodiment of the tape cartridge of the invention, the cartridge further has a back lid for closing a tape extending region of the pocket on a back side of a tape when the tape cartridge is not loaded in the tape recording/reproduction apparatus.

To achieve the second object, according to the present invention, there is provided a tape recording/reproduction apparatus for performing recording and/or reproduction on and/or from a tape in a tape cartridge including a casing body having, in a front portion thereof, a pocket for receiving a head of the apparatus when the tape cartridge is loaded in the apparatus, a front lid movably attached to the casing body so as to open and close a front side of the pocket, and an upper lid movably attached to the casing body so as to open and close an upper side of the pocket. When the upper lid is in an open position for opening the upper side of the pocket, the upper lid is positioned above an upper surface of the casing body so that a lower surface of the upper lid faces the upper surface of the casing body through a gap therebetween thereby allowing pressing means for depressing the cartridge to be placed therein. The tape recording/reproduction apparatus comprises a recording/reproduction apparatus body having an aperture through which the tape cartridge is inserted, and cartridge transport of transfer means for moving the tape cartridge to a predetermined position in the apparatus body by pressing an upper surface of the cartridge inserted in the apparatus body. The cartridge transport means has pressing means or a pressing portion adapted to be placed at least partially in the gap between the lower surface of the upper lid in the opening position above the casing body and the upper surface of the casing body to downwardly press the upper surface of the tape cartridge.

A preferred embodiment of the tape recording/reproduction apparatus of the invention further comprises a cartridge-supporting tray in the apparatus body to receive the tape cartridge inserted through the aperture of the apparatus body, and the pressing portion of the cartridge transport means is adapted to downwardly press the upper surface of the tape cartridge when the tape cartridge is received in the cartridge supporting tray.

In a preferred embodiment of the tape recording-reproduction apparatus, the cassette transport means includes resilient or elastic means for elastically or resiliently performing the above-mentioned downward pressing of the tape cartridge. Preferably, the pressing portion comprises the resilient or elastic means.

To achieve the third object, according to the present invention, there is provided a tape cartridge comprising a casing body formed by combining upper and lower casing members, with the casing body having, in a front portion thereof, a pocket for receiving a head of a tape recording/reproduction apparatus when the tape cartridge is loaded in the apparatus. A tape is accommodated in the casing body, with a front lid being movably attached to the casing body so as to open and close a front side of the pocket. An upper lid is movably attached to the casing body so as to open and close an upper side of the pocket. The casing body has guide grooves in side walls thereof to guide the opening and closing operation of the upper lid. The front lid has side walls for covering the guide grooves substantially entirely when the tape cartridge is unloaded (or loaded) in the recording/reproduction apparatus.

In the tape cartridge arranged as described above, the front cover covering the guide grooves prevents dust from entering the guide grooves when the cartridge is not used, i.e. when unloaded.

To achieve the fourth object, according to the present invention, there is provided a tape cartridge comprising a casing body having left and right tape lead-out openings in its front portion, with the casing body having, between the tape lead-out openings in the front portion, a pocket for receiving a head of a tape recording/reproduction apparatus when the tape cartridge is loaded in the apparatus. A front lid, a back lid and an upper lid are provided for covering a tape extending across the pocket when the cartridge is not loaded in the recording/reproduction apparatus. The front lid is supported on left and right side walls of the casing body through first connecting pivot means so as to open upwardly by moving pivotally on the first connecting pivot means. The front lid is biased by a spring to a closing position thereof. The upper lid has an upper wall for covering an upper side of the pocket, and left and right arms projecting from left and right ends of the upper wall and extending along the outer surfaces of the side walls of the casing body. A front portion of the upper lid and an upper portion of the front lid are pivotally connected to each other through second connecting pivot means. The casing body has horizontal guide grooves in the outer surfaces of its side walls so as to extend slightly upwardly toward the rear end of the casing body, and vertical guide grooves in inner surfaces of side wall portions defining two sides of the pocket. Slide shafts on rear end portions of the arms of the upper lid are fitted in and engaged with the horizontal guide grooves of the casing body so as to move along the horizontal guide grooves. An upper end portion of the back lid is pivotally connected to the upper lid through third connecting pivot means. Slide pins on a lower rear portion of the back lid are fitted in and engaged with the vertical guide grooves of the casing body so as to move upwardly and obliquely away from the front end of the casing body. A substantially entire part of the back lid is adapted to move onto an upper surface of the casing body when the three lids are opened.

In a preferred embodiment of this tape cartridge of the invention, the casing body comprises an upper casing member and a lower casing member. The upper casing member has wall portions to serve as upper wall portions and bottom wall portions of the horizontal guide grooves, while the lower casing member has wall portions to serve as lower wall portions of the horizontal guide grooves. The upper and lower casing members have portions which are connected to each other to provide the left and right side walls of the casing body, and between which the horizontal guide grooves are formed.

In a preferred embodiment of this tape cartridge of the invention, the upper wall of the upper lid has cut-out portions at positions corresponding to the left and right tape lead-out openings of the casing body.

When the front lid is operated to move pivotally and open upwardly, the slide shafts of the upper lid slide in the horizontal guide grooves so that the upper lid moves rearwardly along the horizontal guide grooves while being inclined so that its front end is higher than its rear end. Simultaneously, the slide pins of the back lid slide in the vertical guide grooves so that the upper lid is lifted obliquely and rearwardly by following the movement of the upper lid to move onto the upper surface of the upper wall of the casing body, thereby opening the upper side of the pocket.

Thus, the horizontal guide grooves and the vertical guide grooves are disposed in different positions in an appropriate manner, and the upper lid and the back lid can therefore be operated smoothly as desired to open or close. In the lid opening state, the back lid can retreat or retract from the closing position by moving largely onto the upper surface of the upper lid to provide a sufficiently large space allowing the head to enter the pocket.

To achieve the fifth object, according to the present invention, there is provided a tape cartridge comprising a casing body having left and right tape lead-out openings in a front portion thereof, the casing body having, in the front portion thereof, a pocket for receiving a head of a tape recording/reproduction apparatus when the tape cartridge is loaded in the apparatus, a front lid attached to the casing body so as to cover a front side of a tape extending across the pocket between the left and right tape lead-out openings, a back lid attached to the casing body so as to cover a back side of the tape within the pocket, and an upper lid attached to the casing body so as to cover an upper side of the pocket. The back lid and the upper lid are opened by being linked to an upward opening movement of the front lid.

In this cartridge of the invention, an upper end portion of the back lid is pivotally connected to the upper lid through first connecting pivot means, and one of the back lid and the upper lid has a hole for pivotally supporting the first connecting pivot means. Also, a prevention wall for preventing disengagement of the first connecting pivot means is protrusively formed on a peripheral portion of the hole.

In a preferred embodiment of this tape cartridge of the invention, the front lid is supported on left and right side walls of the casing body through second connecting pivot means so as to open upwardly by moving pivotally on the second connecting pivot means, and the front lid is biased by a spring to a closing position thereof. The upper lid has an upper wall for covering the upper side of the pocket, and left and right arms projecting from left and right ends of the upper wall and extending along outer surfaces of the side walls of the casing body. A front portion of the upper lid and an upper portion of the front lid are pivotally connected to each other through third connecting pivot means. The casing body has horizontal guide grooves in the outer surfaces of its side walls so as to extend slightly upwardly and toward the rear end of the casing body, and vertical guide grooves in inner surfaces of side wall portions defining two sides of the pocket. Slide shafts on rear end portions of the arms of the upper lid are fitted in and engaged with the horizontal guide grooves of the casing body so as to move along the horizonal guide grooves. Slide pins on a lower rear portion of the back lid are fitted in and engaged with the vertical guide grooves of the casing body so as to move upwardly and obliquely toward a rear portion of the casing body.

For example, the first connecting pivot means are provided on the back lid so as to project transversely outwardly while the associated holes are provided in the upper lid. If in this case an external force acts on the back lid in the closed state so that the back lid is pushed toward the front end of the casing body, there is a possibility that the first connecting pivot means will come off the holes without the prevention walls. However, since the preventional walls are protrusively formed on front peripheral portions of the holes, the first connecting pivot means are received by the prevention walls to be maintained in the same position. Accordingly, if the external force is removed, the first connection pivot means are fitted in the holes again by being guided along the prevention walls, thereby maintaining the connecting state.

BRIEF DESCRIPTION OF THE DRAWINGS

FIG. 10 is plan view of an overall internal construction of the cartridge shown in FIG. 9;

DESCRIPTION OF THE PREFERRED EMBODIMENTS

Figure 8:
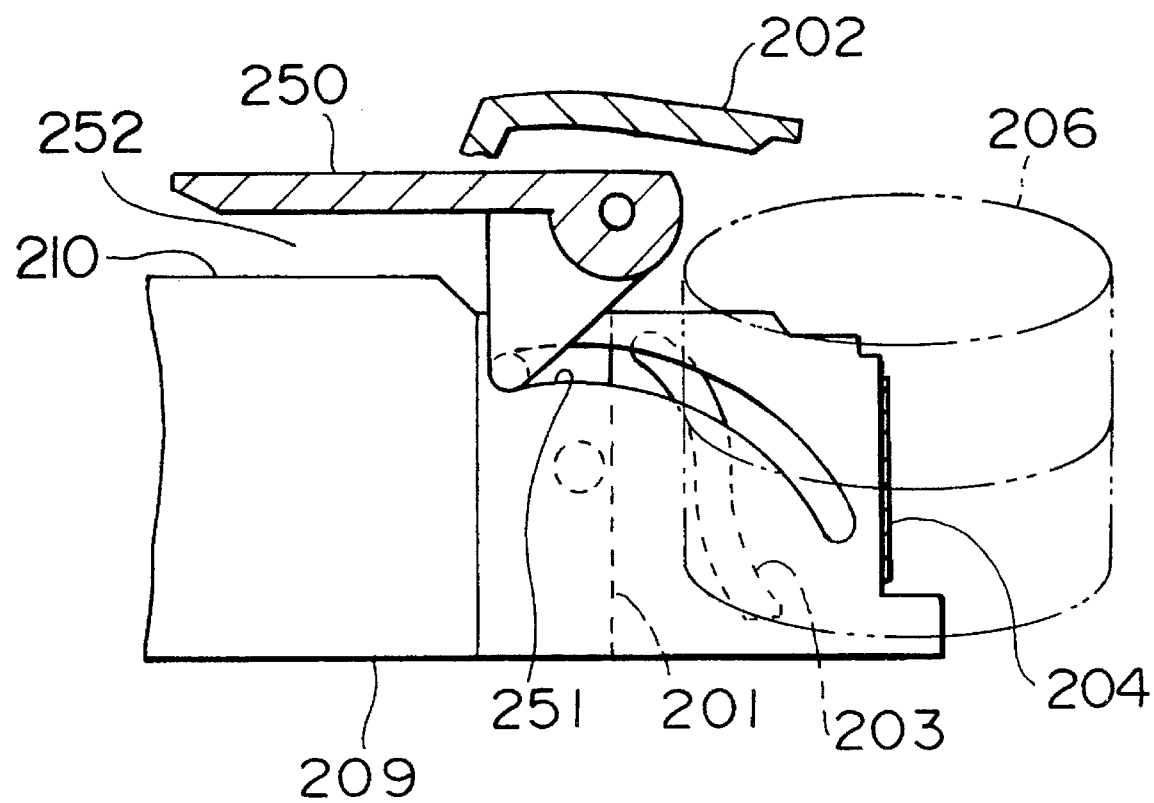
FIG. 8 is a side view of an example of an 8 mm video tape cartridge to facilitate insertion of a cylinder into the opening in the process of achieving the present invention.

An example of the means for solving the problem contemplated in the process of achieving the invention to accomplish the second object of the invention, will first be described with reference to FIG. 8. Referring to FIG. 8, guide grooves 251 are formed in side walls of a cartridge casing body 209 to guide an upper lid 250. That is, if the upper lid 250, capable of opening and closing an upper side of the mouth or pocket portion 201 by its movement along the guide grooves 251, is attached, a cylindrical head, i.e., cylinder for the head, 206 can deeply enter the pocket portion 201 when the lids are opened, so that the overall size of the mechanism for this tape cartridge can be reduced.

Figure 20:
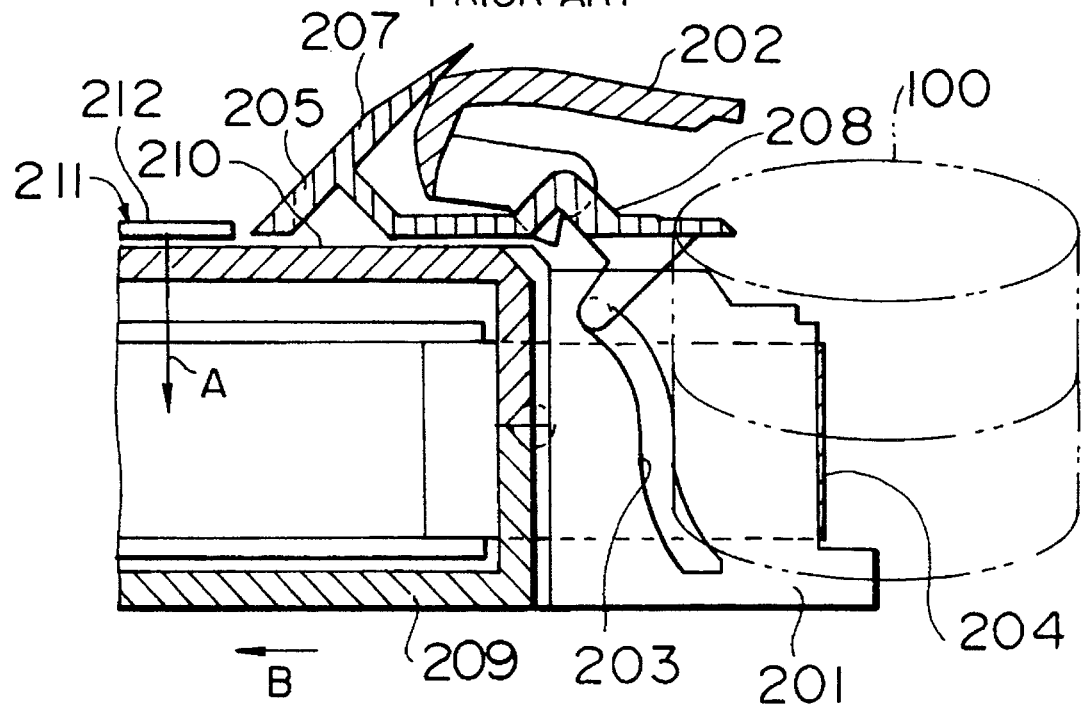
FIG. 20 is a longitudinal side-sectional view, in a lid-opening state, of the part of conventional 8 mm video tape cartridge shown in FIG. 19.
Figure 21:
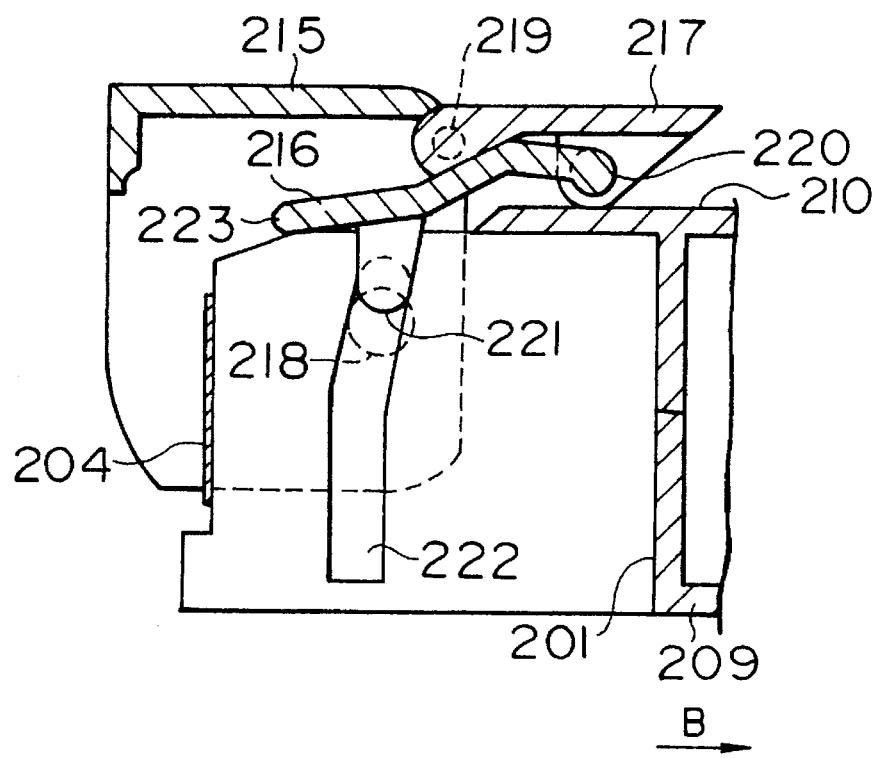
FIG. 21 is a longitudinal side-sectional, in of a lid-opening state, of a part of another conventional 8 mm tape video cartridge.
Figure 22:
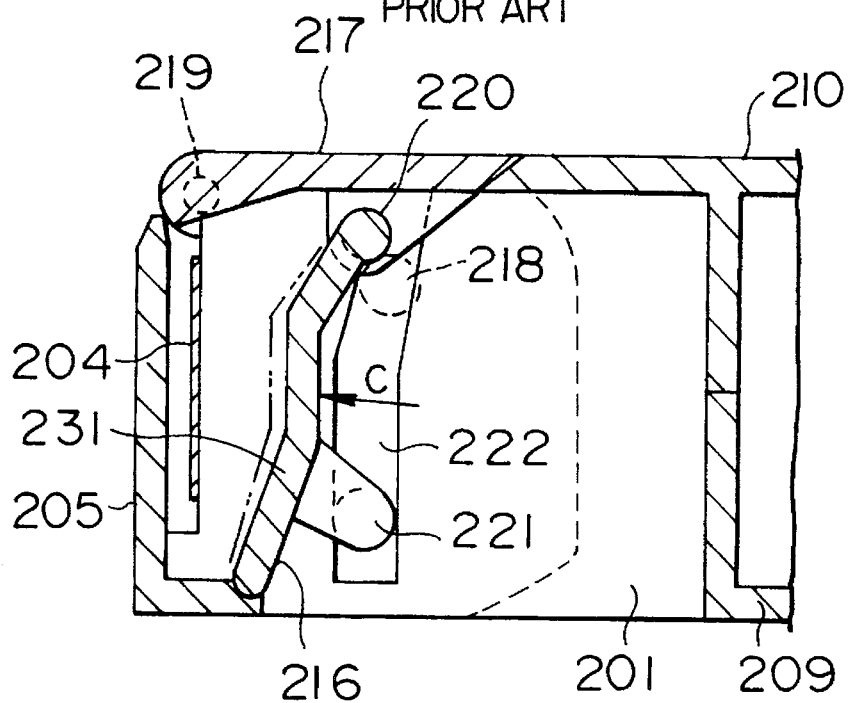
FIG. 22 is a longitudinal side-sectional view, in a lid-closing state, of the part of the conventional 8 mm video tape cartridge shown in FIG. 21.

However, if it is necessary to prevent dust from entering the tape cartridge through the lower side of the pocket portion 201 in the arrangement shown in FIG. 8, it is necessary to attach a slider (not shown), such as that adopted for the DAT cassette (cartridge), for opening and closing the lower side of the pocket portion 201, or an inner lid 205, such as that shown in FIG. 20. When the inner lid is attached, it is necessary to form guide grooves 203 for enabling the desired movement of the inner lid in inner surface of the side walls of the cartridge body 209. Therefore, the guide grooves 251 of the upper lid 250 are required to be formed in outer surfaces of the side walls of the cartridge body 209. Accordingly, the guide grooves 251 are exposed outside the cartridge, and therefore there is a risk of dust entering the grooves 251 so that a mass of dust is formed therein during use for a long period of time. Also, the grooves 251 can easily be damaged by an impact or the like. In such situations, there is a possibility that the upper lid 250 cannot be desirably operated.

A gap 252 may be formed between lids 202, 250 and an upper surface 210 of the casing body 209.

The construction of the tape cartridge will first be described with reference to FIGS. 1 through 5.

Figure 1:
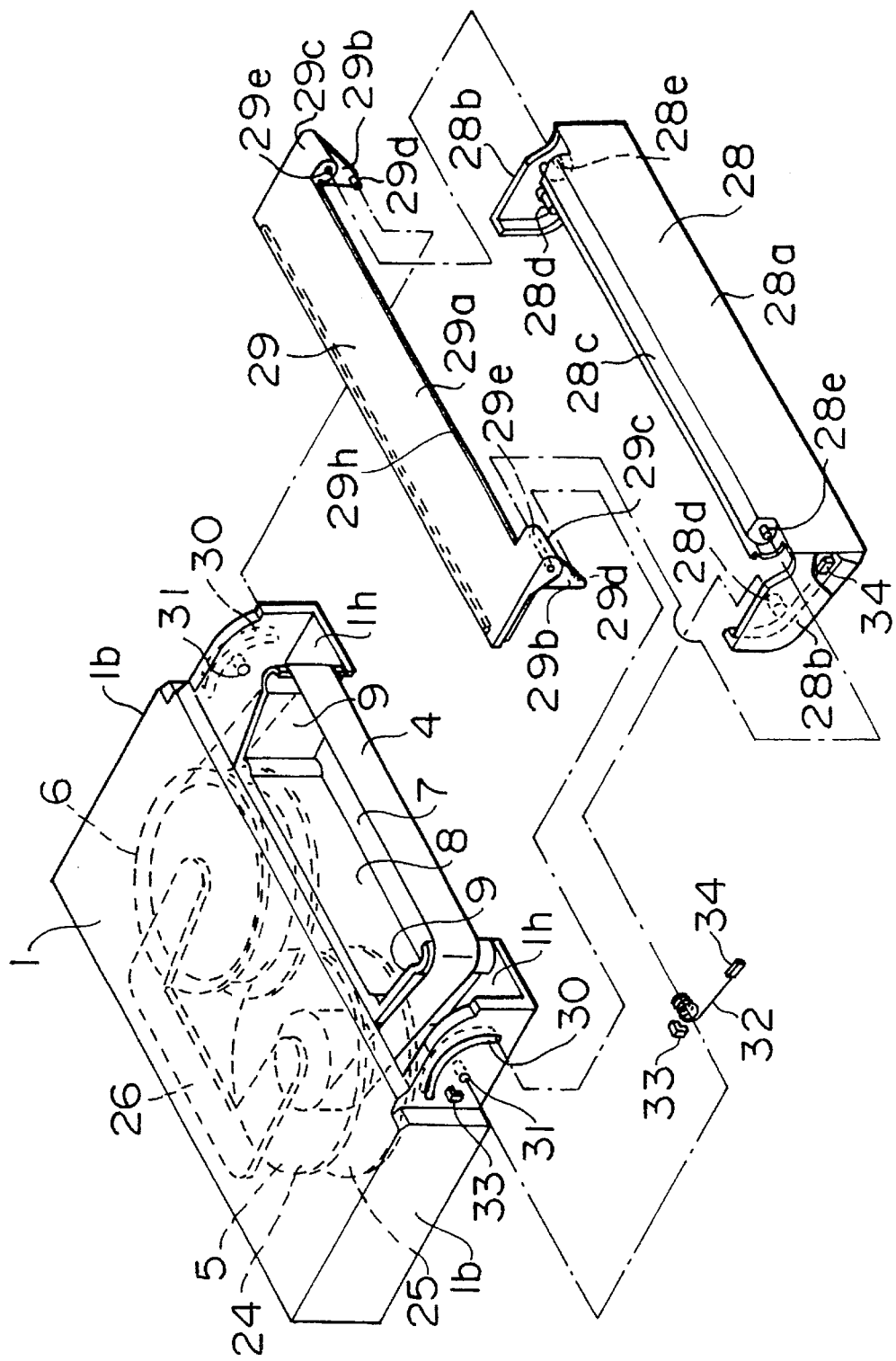
FIG. 1 is an exploded perspective view of a tape cartridge in accordance with the present invention.

Referring to FIG. 1, the tape cartridge is formed of a casing body 1 in which a magnetic tape 4 is accommodated, a front lid 28 capable of moving pivotally on the casing body 1, and an upper lid 29 capable of moving pivotally on the front lid 28.

In the casing body 1, a wind-up or take-up reel 5 and a supply reel 6 are provided. Each of these reels 5, 6 is formed of a center hub (not shown) and upper and lower flanges 24 and 25, and is biased downwardly by a plate or leaf spring 26. In a front section of the casing body 1, a mouth portion or pocket 7 is defined by an inner wall 8, and pocket side walls 9 formed on the left and right hand sides of the inner wall 8. In front portions of side walls 1b of the casing body 1, guide grooves 30 and holes 31 are formed. The guide grooves 30 are engaged with shafts 29d projecting front lid arms 29b of the upper lid 29 to enable the upper lid 29 to move forwardly or rearwardly. The holes 31 are engaged with or fitted around pivots 28d projecting from side walls 28b of the front lid 28 to enable the front lid 28 to move pivotally. A torsion coil spring 32 serves to constantly urge the front lid 28 in a closing direction, with the spring 32 being engaged with spring hooks 33 and 34.

Figure 5:
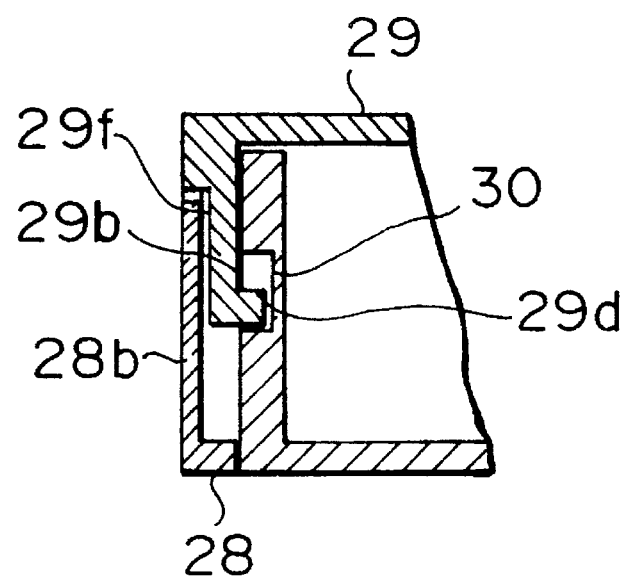
FIG. 5 is a cross-sectional view of a part of the cartridge taken along the line V—V of FIG. 4.

As shown in FIG. 1, the upper lid 29 has an upper side plate 29a, having a cut-out portion 29h on its front side, capable of closing the upper side of the pocket 7, and cylindrical connecting portions 29c formed continuously with left and right end portions of the upper side plate 29a. In these connecting portions 29c, holes 29e are formed, which can be fitted to connecting pivots 28e of the front lid 28. On distal end portions of the lid arms 29b formed perpendicularly on the left and right ends of the upper plate 29a, the shafts 29d capable of engaging with the above-mentioned guide grooves 30 are formed so as to project inwardly. On outer surfaces of the lid arms 29b, accommodated portions or thin wall portions 29f are formed, for example, by cutting the lid arms 29b to a depth corresponding to the thickness of the side walls 28b of the front lid 28, as shown in FIG. 5. Accordingly, the side walls 28b of the front lid 28 and the arms 29b of the upper lid 29 are in an overlapping relationship with respect to each other when the upper lid 29 and the front lid 28 are connected.

As shown in FIG. 1, the front lid 28 has a front wall 28a which can close the front side of the pocket 7, and the above-mentioned side walls 28b formed integrally with the left and right ends of the front wall 28a so as to extend rearwardly. The front wall 28a has a projecting portion 28c formed by upwardly extending a part of its central portion, and the above-mentioned connecting pivots 28e project transversely outwardly from two side surfaces of the projecting portion 28c. Accordingly, the upper lid 29 is pivotally connected to the front lid 28 with the holes 29e of its connecting portions 29c fitted to the connecting pivots 28e.

Figure 2:
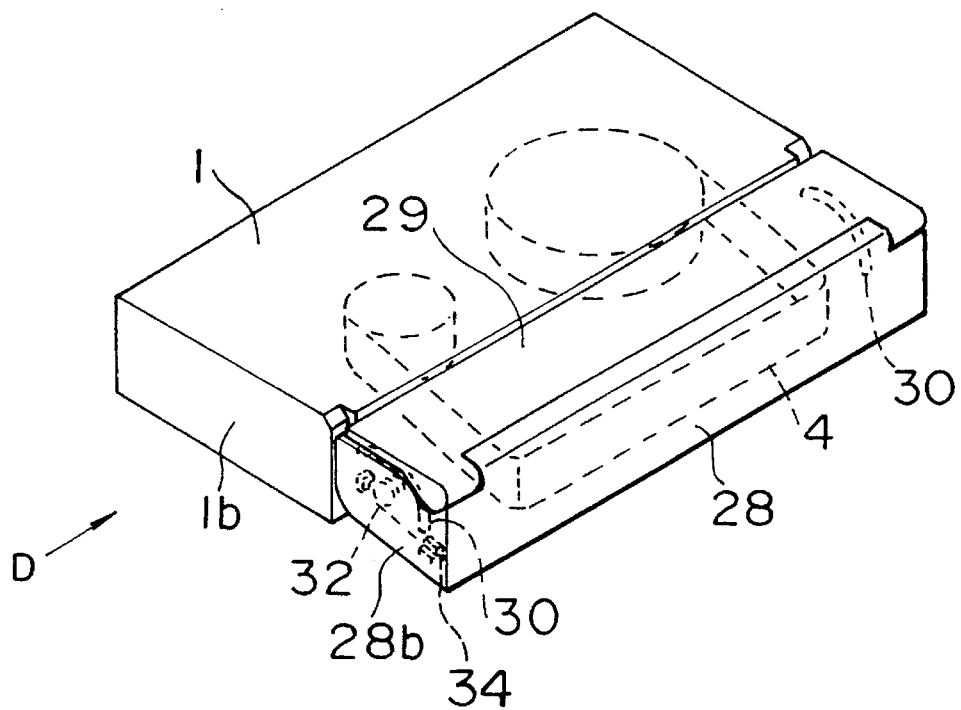
FIG. 2 is a perspective view of an appearance, in an unused (unloaded) state, of the tape cartridge shown in FIG. 1.

When the cartridge is in a state of being not used, i.e., in an unloaded state shown in FIG. 2, the front lid 28 covers the front side of the pocket portion 7 of the cartridge, while the upper lid 29 covers the upper side of the front pocket portion 7 of the cartridge, whereby the magnetic tape 4 extending through the pocket 7 between tape lead-out openings 1h is protected or shielded from dust. When the cartridge is in a state of being used, i.e., a loaded state shown in FIG. 3, the front lid 28 is pivotally moved on the casing body 1 to open the front side of the pocket 7, thereby exposing the magnetic tape 4. By being linked to this movement, the upper lid 29 slides rearwardly along the guide grooves 30 of the casing body 1 to open the upper side of the pocket 7. As a result, a cylindrical head, i.e., cylinder having a head (not shown) of a recording/reproduction apparatus can advance deeply into an inner portion of the opened pocket 7. Thus, an overall size of the mechanism of the apparatus can be reduced.

In this tape cartridge, the guide grooves 30 are covered with the side walls 28b of the front lid 28 when the cartridge is not used, thereby preventing dust from entering the guide grooves 30 as well as preventing the guide grooves 30 from being damaged.

An embodiment of a recording/reproduction apparatus having a cartridge transport or transfer means 43 for loading the above-described tape cartridge in a predetermined position in a main body 42 of the recording/reproduction apparatus will be described with reference to FIGS. 6, 6A and 7.

Figure 6:
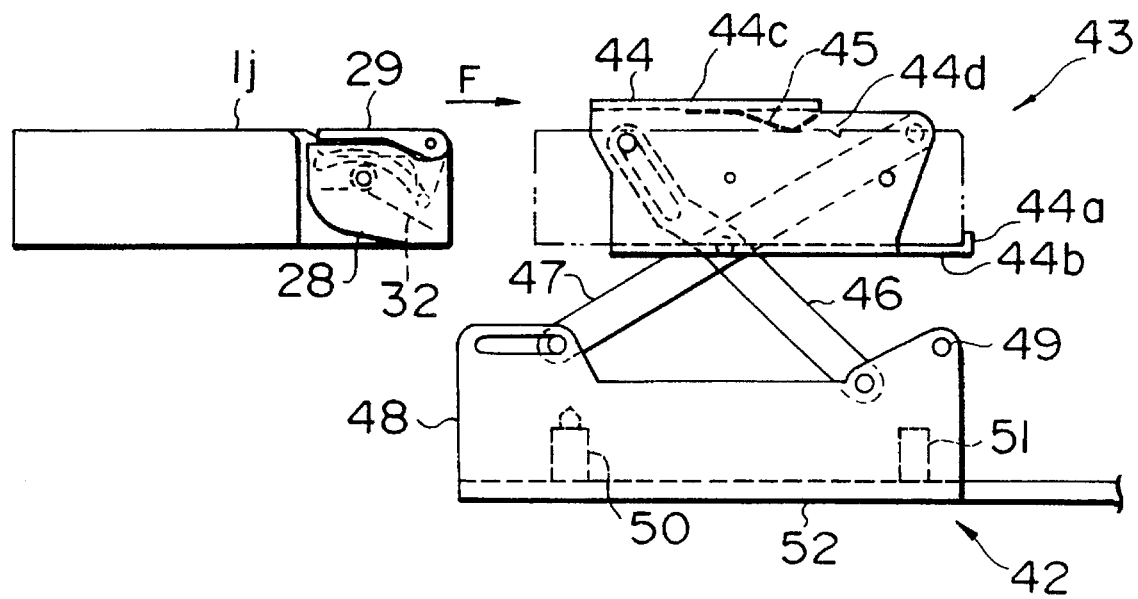
FIG. 6 is a side view of a state of cartridge transport means when the cartridge is in the unloaded state.
Figure 6A:
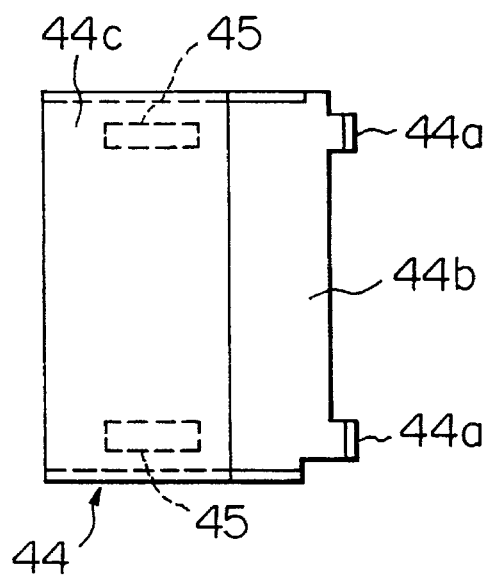
FIG. 6A is a plan view of a cartridge-supporting tray.
Figure 7:
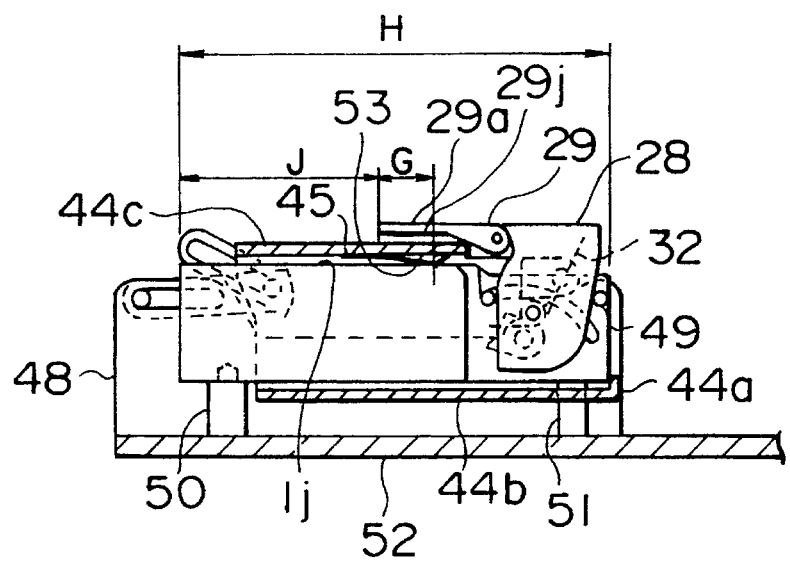
FIG. 7 is a side view of a state of the cartridge transport means when the cartridge is in the loaded state.

As shown in FIGS. 6, 6A and 7, a cartridge holder or cartridge-supporting tray 44 for inserting the cartridge therein is provided, which is formed of a bottom wall 44b, a top wall 44c and left and right side walls 44d. A plurality of cartridge pressing springs (cartridge pressing means or portions) 45 are arranged in the widthwise or transverse direction of the cartridge, as shown in FIG. 6A. However, only one spring 45 may be provided at a center in the widthwise direction, or three or more springs 45 may be provided. Members 46 and 47 are link levers. Side plates 48 swingably or slidably support the link levers 46 and 47. Lid opening pin 49 are integrally fixed to the side plates 48. A cartridge positioning pin 50 and cartridge mount pin 51 are provided on a chassis of 52 of the body 42 of the recording/ reproduction apparatus. Other portions of the recording/ reproduction apparatus body 42 are well known (see, for example, U.S. Pat. No. 3,900,171) and are not further described or illustrated.

Figure 3:
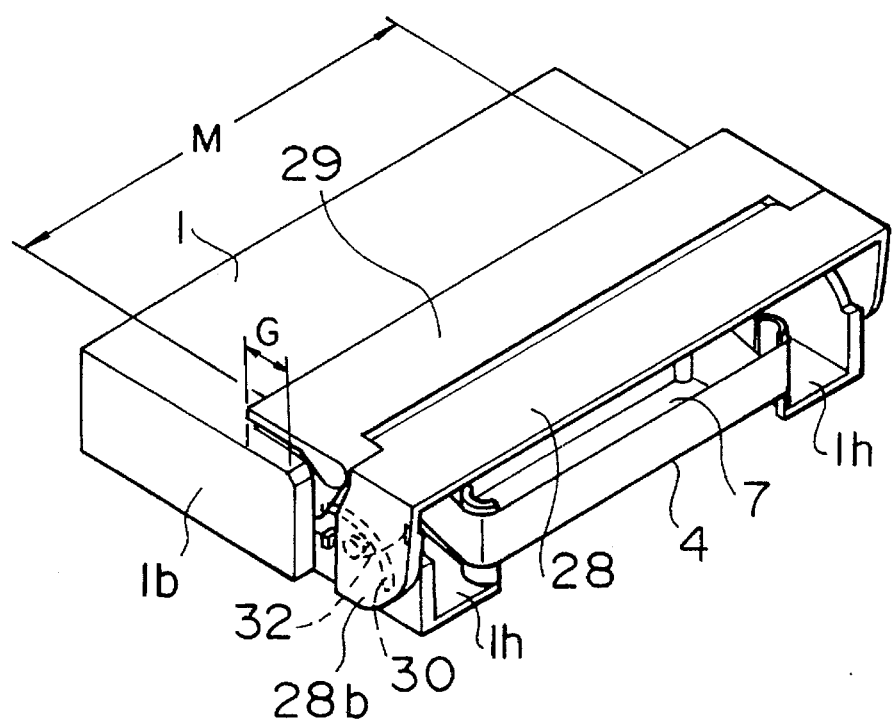
FIG. 3 is a perspective view of an appearance, in a used (loaded) state, of the tape cartridge shown in FIG. 1.
Figure 4:
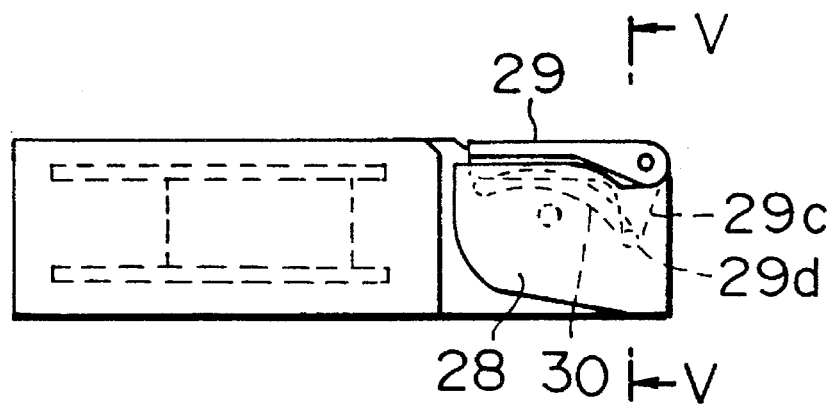
FIG. 4 is a side view of the cartridge as seen in a direction of the arrow D in FIG. 2.

The states of the tape cartridge shown in FIGS. 6 and 7 correspond to the lid-opening state and lid-closing state shown in FIGS. 2 and 3, respectively. When the tape cartridge, indicated by a thick solid line in FIG. 6, is pushed into the cartridge-supporting tray 44 in the direction of the arrow F to a position as indicated by an imaginary line in FIG. 6, the upper surface of the tape cartridge is pressed by the cartridge pressing springs 45 and the tape cartridge is brought into abutment against a positioning projection 44a formed on the cartridge-supporting tray 44 so that the insertion movement of the tape cartridge is stopped. From this state, the cartridge supporting tray 44 is depressed to be set in the body 42 of the apparatus. The tape cartridge is thereby placed in a position determined by the cartridge positioning pin 50 and the cartridge mount pin 51 while being retained by being pressed by the cartridge pressing springs 45, as shown in FIG. 7. Further, at the front portion of the cartridge, the lid opening pins 49 and the front lid 28 contact each other, with the front lid 28 thereby being pivotally moved and opened, and the upper lid 29 being slid rearwardly and opened. By this opening operation, the upper lid 29 is moved above the top wall 44c of the cartridge-opening tray 44 and the springs 45 as pressing members (means).

A cartridge pressing region G in which the cartridge is pressed by the pressing springs 45 during this lid opening operation is located in a gap 53, i.e., a space, formed between a lower surface 29j of the upper lid 29 and an upper surface 1j of the casing body 1. The width M of the gap 53, through which the pressing means 45 is inserted, corresponds to the width of the region of the lids 28 and 29 excluding the left and right side walls thereof, as shown in FIG. 3.

The reason for this pressing region setting is as described below. There is a problem of the cartridge being lifted on the front side thereof by the reaction of torsion spring 32 urging the front lid 28 if the cartridge pressing springs 45 are placed at a position corresponding to a rear or backward portion of the cartridge. That is, in a cartridge having the upper lid 29, the upper lid 29 covers a majority of or substantial part of the supper surface 1j of the cartridge casing body 1 when the lids are opened. For example, if the size of the cartridge in the direction of depth of the cartridge-supporting tray 44 is H as shown in FIG. 7, a region J in which the cartridge pressing springs 45 do not interfere with (overlap) the upper lid 29 has a depth which is substantially H/2.

In this case, the upper lid 29 occupies a substantially part of the upper surface 1j of the cartridge casing body 1. In conventional construction, it has been necessary to provide cartridge pressing springs in the region J where the cartridge pressing springs do not interfere with the upper lid. If pressing springs (not shown) are provided in the region J, i.e., in positions such as to face the rear part of the cartridge, the cartridge is likely to be lifted on the front side thereof by the reaction of the torsion spring 32 which urges the front lid to close the same. This problem may be solved by setting the pressing force of the pressing springs to a larger magnitude. However, if the cartridge becomes smaller than the DAT cassette (cartridge), and if the pressing force of the pressing springs is increased, a new problem then arises in that the cartridge can not be inserted easily into the cartridge-supporting tray 44.

In contrast, in the case of the cartridge and the recording/ reproduction apparatus in accordance with the invention, the pressing springs 45 are inserted in the gap 53 between the upper lid 29 and the casing body 1 of the cartridge. Therefore, the pressing region G of the pressing springs 45 is located just below the upper side plate 29a of the upper lid 29 and closer to the front end of the cartridge, thereby making it possible to prevent the cartridge from being lifted on the front side. Correspondingly, the pressing force of the pressing springs 45 can be set to a smaller magnitude to enable the cartridge to be easily inserted. Consequently, the pressing range can be extended toward the front end of the cartridge to an amount corresponding to the length of the space 53 to enable cartridge to be loaded with improved stability in comparison with the case of setting pressing springs in the region J corresponding to the rear part of the cartridge.

Figure 7A:
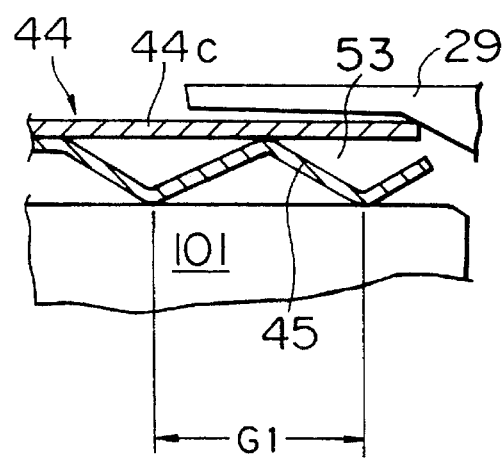
FIG. 7A is a cross-sectional view of a modification of the cartridge transport means.

As shown in FIG. 7A, a part of a region G1 in which the casing body 1 is pressed by springs 45 provided as pressing means may project rearwardly out of the gap 53.

Also, needless to say, portions of the pressing means 45 and the pressing means-supporting member (wall 44c of the cartridge-supporting tray 44) not brought into contact with the upper surface 1j of the casing body 1 may be extended rearwardly of the upper surface 1j of the casing body 1.

Figure 7B:
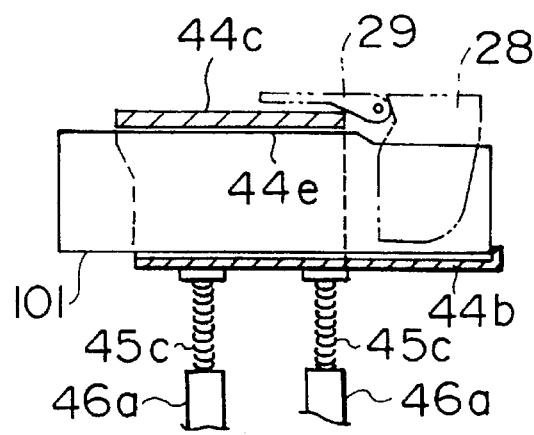
FIG. 7B is a schematic illustration of another modification of the cartridge transport means.

Further, the arrangement may alternatively be such that, as shown in FIG. 7B, the cartridge (casing body 1) is depressed directly by a lower surface 44e of the top wall 44c of the cartridge supporting tray 44. In such a case, the bottom wall 44b or the side walls 44d of the cartridge-supporting tray 44 may be pulled down by a suitable transport (displacement) means 46a. A connection 45c between the pull down means 46a and the cartridge-supporting tray 44 comprises an elastic connection means such as a spring.

In the tape cartridge and the recording/reproduction apparatus loaded with the tape cartridge, as described above, the cartridge is constructed so that a gap is formed between a lower surface of an upper lid and an upper surface of a casing body of the cartridge when the lid is opened at the time of cartridge loading, and so that at least a part of cartridge pressing means (pressing portion) in a transport means of the recording/reproduction apparatus can be inserted into the gap. Also, the cartridge and the recording/reproduction apparatus are arranged so that at least a part of the pressing means for pressing and holding the cartridge in the transport means for moving the cartridge to a predetermined position in the apparatus is positioned in the gap (space) between the upper lid and the upper surface of the cartridge casing body and at a front portion of the cartridge. Therefore, the tape cartridge can be stably loaded into a predetermined position of the apparatus without fear that a front part of the cartridge is lifted relative to a rear part thereof.

Also, guide grooves for sliding the upper lid rearwardly when the tape cartridge is not used are covered with a front lid to prevent dust from entering the guide grooves. Therefore, the guide grooves are prevented from being damaged and the upper lid can be stably moved. In this manner, a tape cartridge and a recording/reproduction apparatus having improved reliability can be provided.

Figure 10A:
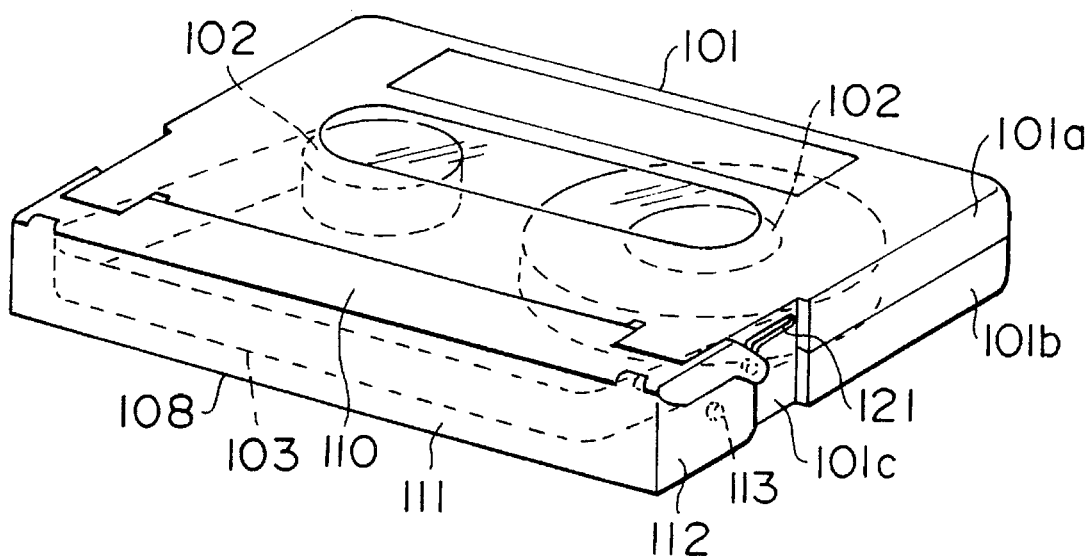
FIG. 10A is a perspective view of the cartridge shown in FIG. 9.

Referring to FIGS. 10 and 10A, a pair of hubs 102 around which a tape 103 is wound are provided in left and right positions inside a casing body 101. The tape 103, drawn out from one of the hubs 102, is guided by tape guides 105 provided at tape lead-out openings 104 formed in left and right front portions of the casing body 101 and is wound around the outer hub 102. A pocket 106 for tape loading is formed at a central part of a front portion of the casing body 101, i.e., between the left and right tape lead-out openings 104, with the pocket 106 being open at its upper, lower and front sides.

To protect the tape 103 and to prevent dust from sticking to the tape 103 when the tape 103 is not in use, a portion of the tape 103 extension through a front section of the pocket 106 is covered with a front lid 108, a back lid 109 and an upper lid 110, each formed of a plastic molded member, at the time of unloading of the cartridge.

Figure 11:
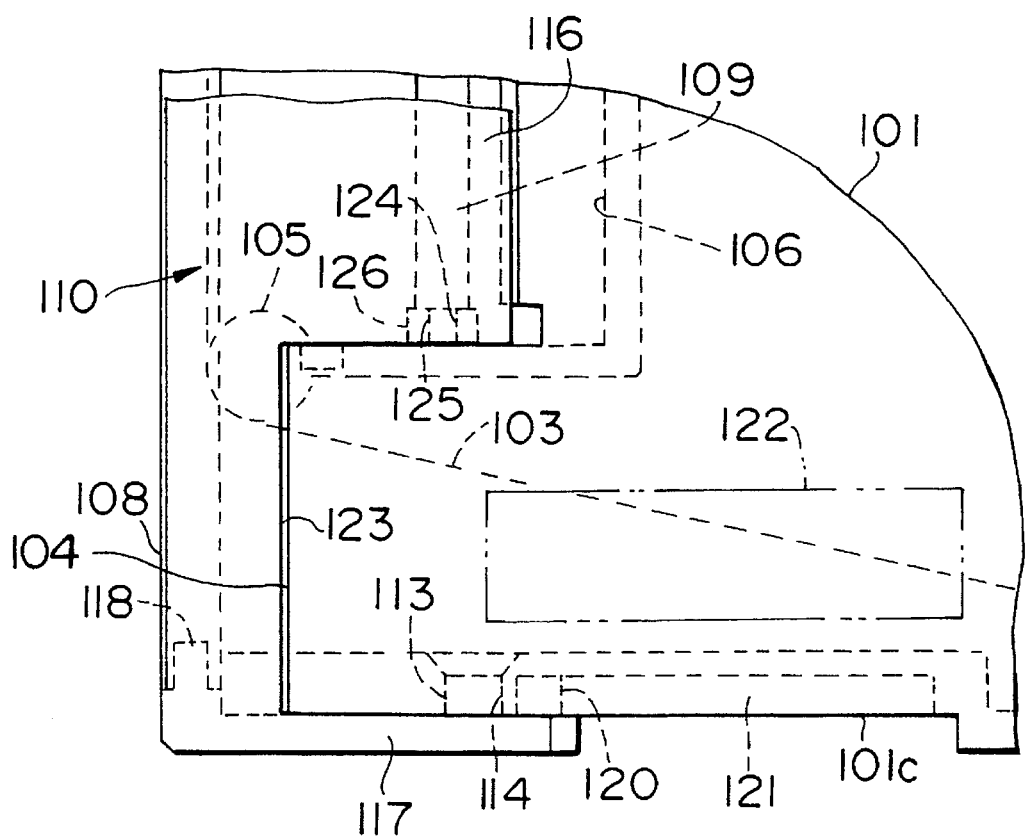
FIG. 11 is an enlarged plan view of a part of the cartridge shown in FIG. 9.
Figure 13:
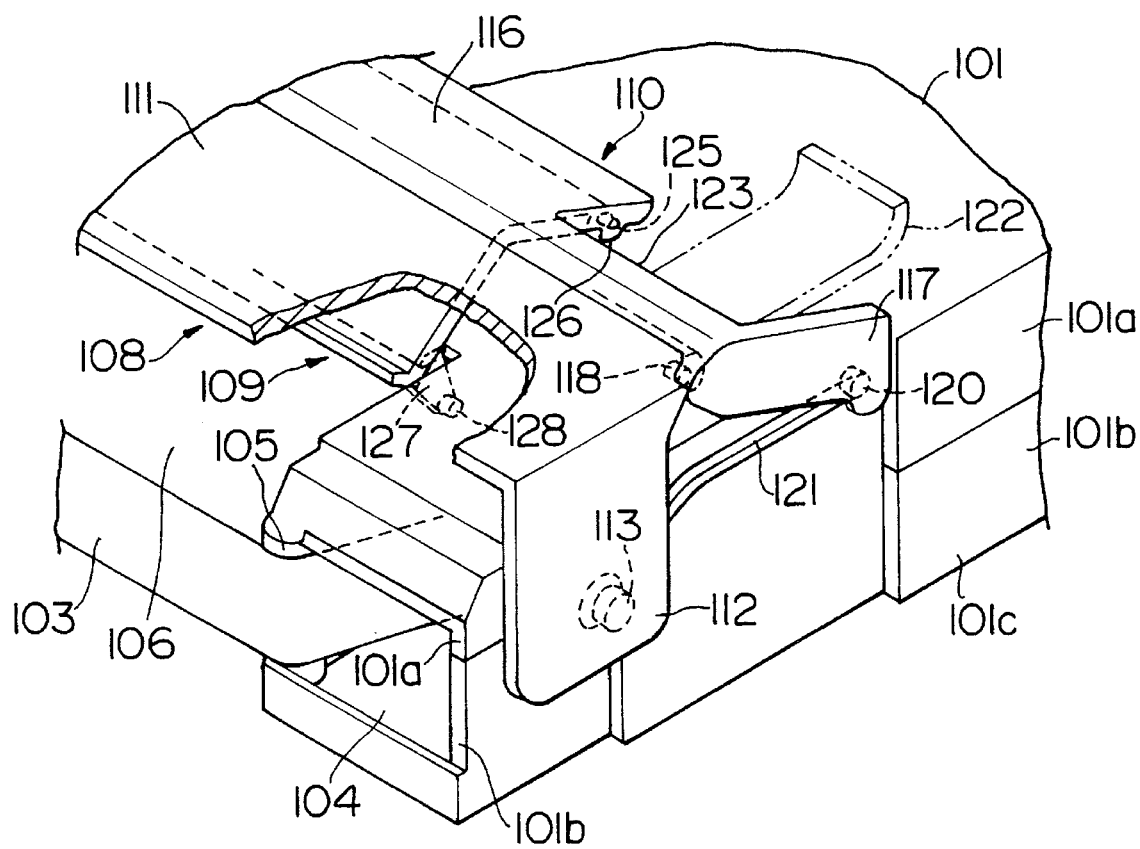
FIG. 13 is a partially cut-away perspective view of the portion shown in FIG. 11.

Referring to FIG. 10A and FIGS. 11 and 13, the front lid 108 has a major wall 111 which closes the front side of the casing body 101 including the open front side of the casing body 101 including the open front side of the pocket 106 over the entire width of the casing body 101, and side walls 112 extending rearwardly from the left and right ends of the major wall 111. Connecting pivots 113 are formed in opposing positions on inner surfaces of the side walls 112 to project inwardly. The side walls 112 of the front lid 108 are fitted to outer surfaces of front end portions of left and right side walls 101c of the casing body 101, with the connecting pivots 113 fitted to pivot holes 114 formed in the front end portions of the side walls 101c, thereby enabling the front lid 108 to pivotally move on the connecting pivots 113 to open upwardly. The front lid 108 is biased in a direction to be pivotally closed by a torsion coil spring 115 (FIG. 14) fitted around one of the connecting pivots 113.

The upper lid 110 has a flat upper wall 116 which closes the upper side of the pocket 106. A pair of left and right arms 117 are formed on left and right ends of the upper wall 116 so as to project rearwardly along outer surfaces of the side walls 101c of the casing body 101.

The upper lid 110 is opened and closed according to the opening/closing movement of the front lid 108. For this linkage, connecting pivots 118 are formed on front portions of the left and right arms 117 of the upper lid 110 to project transversely inwardly. The connecting pivots 118 are fitted to connecting holes in upper left and right portion of the front lid 108. Slide shafts 120 are formed on rear-ends of inner surfaces of the arms 117 and are fitted in and engaged with horizontal guide grooves 121 in the outer surfaces of the side walls 101 c of the casing body 101. The horizontal guide grooves 121 extend in the front-rear direction of the cartridge and have front-end portions sloped down toward their front ends.

The upper wall 116 of the upper lid 110 have left and right cut-out portions 123 corresponding to (upper walls of) the tape lead-out openings 104.

Figure 12:
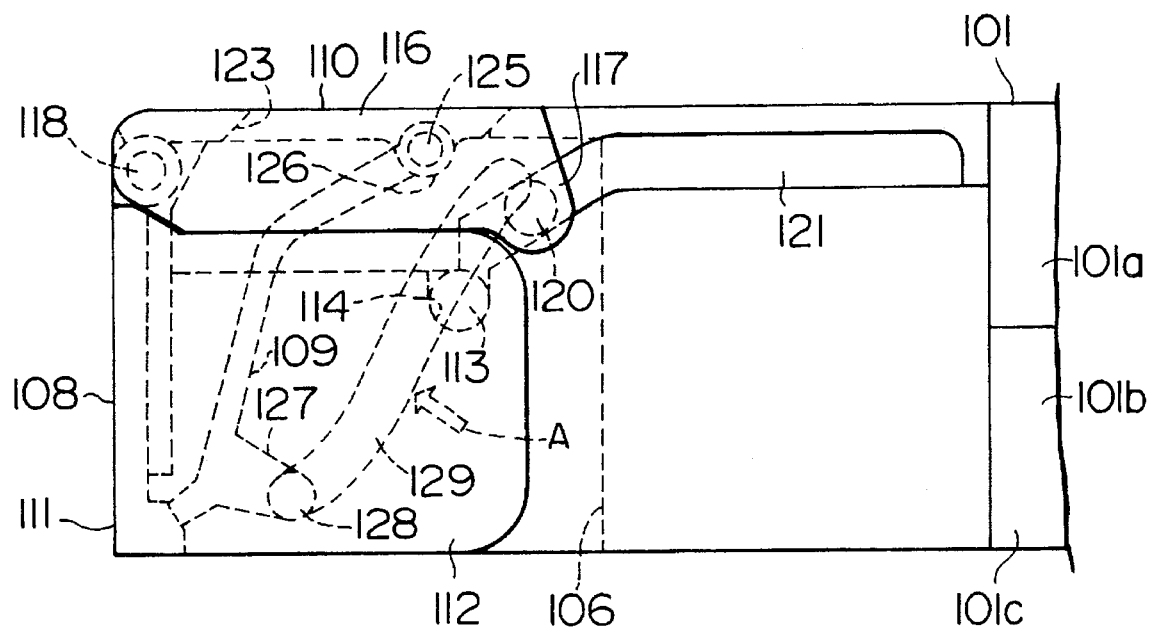
FIG. 12 is a side view of the portion shown in FIG. 11.
Figure 14:
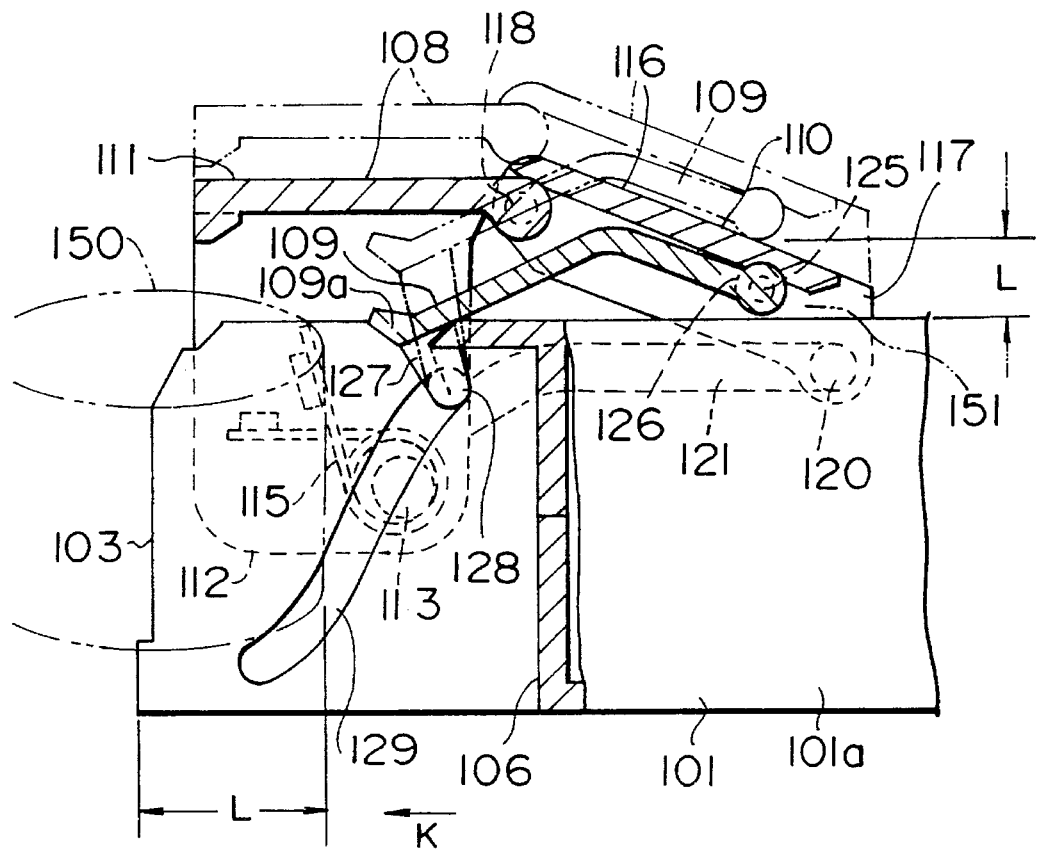
FIG. 14 is a longitudinal side-sectional view of the portion shown in FIG. 11, showing relationship between the magnetic head and the pocket.

This connection structure enables the upper lid 110 to move forwardly and rearwardly between the closing position shown in FIG. 12, at which the upper wall 116 closes the upper side of the pocket 106 continuously with the front lid 108, and the opening position shown in FIG. 14, to which the upper wall 116 retracts from the upper side of the pocket 106 by moving toward a rear portion of the casing onto the upper surface of the upper wall of the casing body 101. Since the upper wall 116 is formed with the cut-out portions 123, it does not interfere with the upper walls of the tape lead-out openings 104 when the upper lid 110 is opened or closed, even though the arms 117 of the upper lid 110 are formed continuously with the left and right ends of the upper wall 116. It is therefore possible for the upper lid 110 to smoothly move to open or close the upper side of the pocket 106.

In a state of the tape cartridge being loaded in a recording/reproduction apparatus, a plurality of portions of the upper wall of the casing body 101 are pressed and retained by retention springs 122 of the recording/reproduction apparatus, as shown in FIG. 13. Even if one pair of retention springs 122 are positioned close to the upper walls of the tape lead-out openings 104 as shown in FIG. 11, the upper wall 116 does not contact or interfere with the retention springs 122 by virtue of the presence of the cut-out portions 123 when the upper lid 110 is opened.

The back lid 109 is formed of a plate slightly bent as viewed in a cross section perpendicular to the transverse direction of the case body 101. The back lid 109 has connecting pins 125 protrusively formed on its left and right ends of an upper end portion thereof. The back lid 109 is connected to the upper lid 110 by fitting the connecting pins 125 into holes in bosses 126 on inner surfaces of the upper wall 116 of the upper lid 110. The back lid 109 also has leg portions 127 projecting from rear surfaces of its lower left and right portions. Slide pins 128 provided on the leg portions 127 are movably engaged with and fitted in S-shaped vertical guide grooves 129 formed in the left and right side walls of the pocket 106 so as to extend slantingly and upwardly away from the front end of the casing body 101. This connection structure enables the back lid 109 to move between a closing position at which the back lid 109 faces the reverse or rear side of the tape 103 in the pocket 106 and an opening position at which the back lid 109 is situated horizontally on the upper surface of the upper wall of the casing body 101 after moving onto the same.

To ensure that a generally entire part of the back lid 109 can move onto the upper surface of the upper wall of the casing body 101, it is necessary to set the amount of movement of the upper lid 110 in the front-rear direction of the cartridge at least to a value closer to the length, in the front-rear direction, of the back lid 109 in the state of being laid horizontally. Preferably, the upper ends of the vertical guide grooves 129 are positioned closer to a rear portion of the upper side opening of the pocket 106, and the slide pins 128 are moved and guided closer to the rear portion of the upper side opening of the pocket 106 when the lids 108–110 are opened.

In the lid closing state, the front lid 108 covers the front side of the casing body 101 including the front side of the pocket 106, the upper lid 110 covers the upper side of the pocket 106, and the back lid 109 covers the tape 103 on the back or rear side of the same in the pocket 106.

Figure 9:
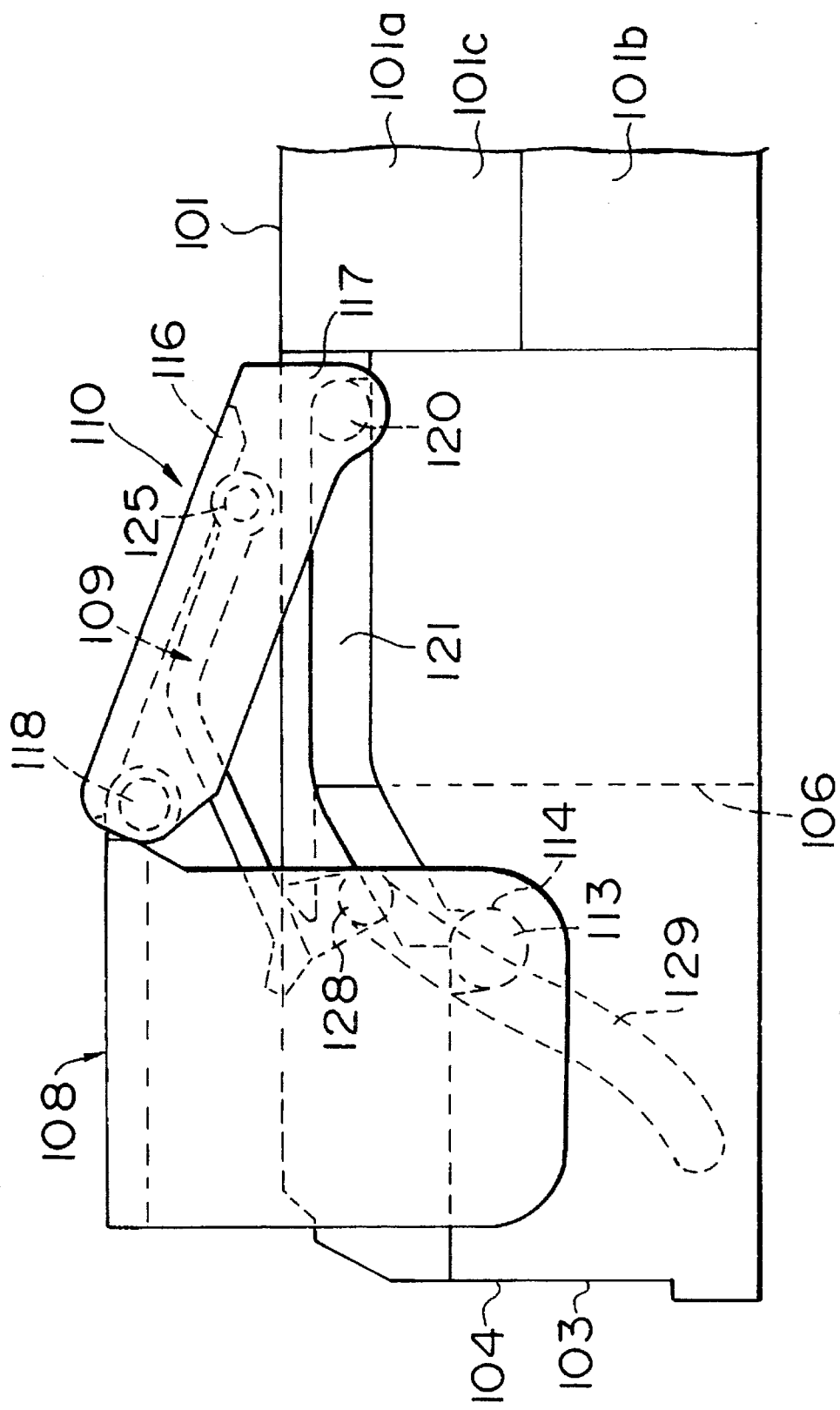
FIG. 9 is a side view of a lid-opening state of a tape cartridge in accordance with another embodiment of the present invention.

When the tape cartridge in this state is loaded into the tape deck, i.e., the recording/reproduction apparatus, the front lid 108 is pushed up by an operating member of the tape deck to pivotally move upwardly around the connecting pivots 113 to open upwardly. With the pivotal movement of the front lid 108, the upper lid 110 moves toward the rear end of the casing body 101 along the horizontal guide grooves 121 while being inclined so that its front end is higher than its rear end until its upper wall 116 moves above the upper surface of the upper wall of the casing body 101. The back lid 109 moves obliquely upwardly along the vertical guide grooves 129 by being drawn by the upper lid 110 to move onto and laid on the upper surface of the upper wall of the casing body 101, as shown in FIGS. 9 and 14.

In this lid opening state, the pocket 106 is opened substantially completely except that a front end portion 109*a* of the back lid 109 projects over the upper side opening of the pocket 106 in the direction of the arrow K. Accordingly, a rotary magnetic head 150, i.e. head cylinder, of the tape deck can be positioned in the pocket 106 to complete tape loading. In correspondence with the amount of intrusion of the magnetic head 150 into the pocket 106 (an increase in length L), the overall size of the deck can be reduced.

In the protective lid structure having the front lid 108, back lid 109 and upper lid 110 to protect the tape 103, the operation of assembling the protective lids 108, 109, and 110 on the casing body 101 may become difficult. This is because all of the connecting pivots 113, the slide shafts 120 and the slide pins 128 must be fitted respectively in the pivot holes 114, the horizontal guide grooves 121 and the vertical guide grooves 129 formed in the casing 101.

To facilitate the assembling operation, the pivot holes 114 and the horizontal guide grooves 121 are formed between fitting or engaging portions of upper and lower casing members 101*a* and 101*b*.

Figure 15:
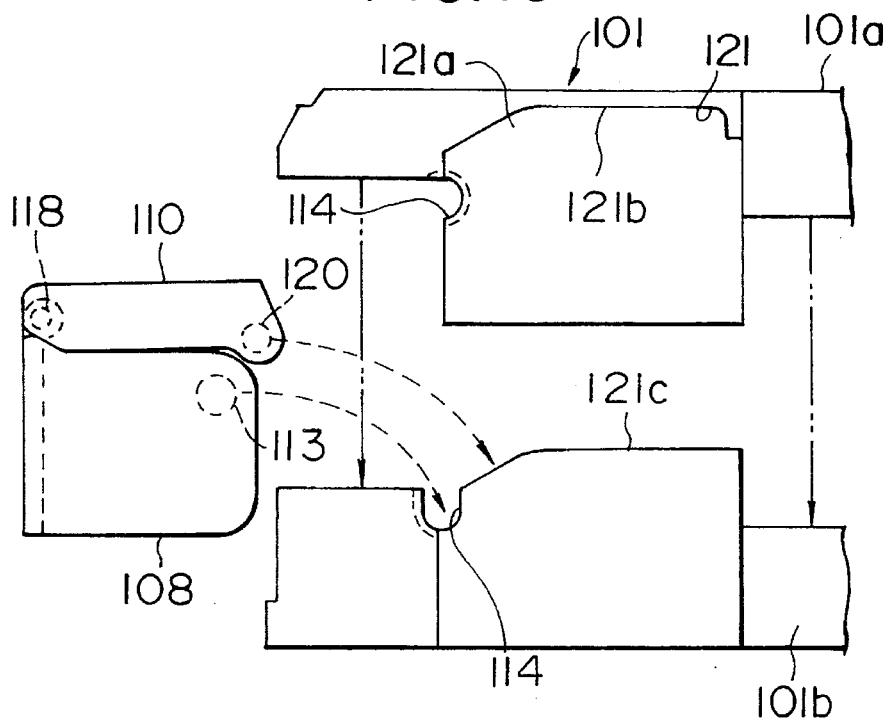
FIG. 15 is a side view of the portion shown in FIG. 11, illustrating a procedure of assembling lids on the casing body.

More specifically, as illustrated in detail in FIG. 15, an upper wall surface 121*b* and a bottom wall surface 121*a* of each horizontal guide groove 121 are integrally formed as portions of the upper casing member 101*a*, while a lower wall surface 121*c* of the horizontal guide groove 121 is integrally formed as a portion of the lower casing member 101*b*. The axial holes 114 are formed between portions of the upper and lower casing members 101*a* and 101*b* corresponding to lower front-end portions of the horizontal guide grooves 121. The front lid 108 and the upper lid 110 are temporarily assembled on the lower casing member 101*b*, and the upper casing member 101*a* is thereafter mounted on the lower casing member 101*b*. In this manner, the connecting pivots 113 and the slide shafts 120 are assembled in the pivot holes 114 and the horizontal guide grooves 121, respectively. The slide pins 128 of the back lid 109 may be assembled in the vertical guide grooves 129 when the front lid 108 and the upper lid 110 are temporarily assembled on the lower casing member 101*b*.

The front lid 108 and the upper lid 110 are connected by the connecting pivots 118 at the opposite side ends of the lids 108 and 110. However, the lids 108 and 110 may be connected by connecting pivots 118, for example, on left and right portions of the upper lid 110 or the front lid 108 facing the pocket 106.

The three lids, i.e., the front lid 108, the back lid 109 and the upper lid 110, protect the tape in an unused or unloaded state. Since the displacement or movement of the upper lid 110 is guided by the horizontal guide grooves 121 in the casing body 101, the upper side of the pocket 106 can be opened in such a manner that the amount of movement of the upper lid 110 toward the rear end of the casing body 101 is set to a sufficiently large value and the back lid 109 is drawn to overlap the upper surface of the upper wall of the casing 101 to a large extent according to the rearward movement of the upper lid 110 when the lids 108–110 are opened. As a result, a magnetic head 150 of the tape deck can deeply enter the pocket 106, and the overall size of the tape deck can be reduced.

Since the opening or closing movements of the upper lid 110 and the back lid 109 are respectively guided and restrained by the horizontal guide grooves 121 in the outer surfaces of the left and right side walls 101*c* of the casing body 101 and the vertical guide grooves 129 in the side walls of the pocket 106, the horizontal guide grooves 121 and the vertical guide grooves 129 can be appropriately disposed separately from each other, thereby improving the reliability of the opening/closing operation of the upper lid 110 and the back lid 109.

Although the left and right arms 117 of the upper lid 110 extend along the outer surfaces of the left and right side walls 101*c* of the casing body 101, the cutout portions 123 formed in the upper wall 116 of the upper lid 110 avoid contact or interference between the upper wall 116 and the upper walls of the tape lead-out openings 104 during the opening/closing operation of the upper lid 110.

If the lids 108, 109, and 110 and other related engagement elements are arranged so that, as indicated by imaginary lines in FIG. 14, a gap 151 having a size of at least L is formed between the front, back and upper lids 108, 109, and 110 and the upper surface of the casing body 101, pressing means (pressing portions) of a cartridge transport or transfer means of the tape deck can be positioned in the gap 151 to downwardly press a front portion of the cartridge.

Figure 16A:
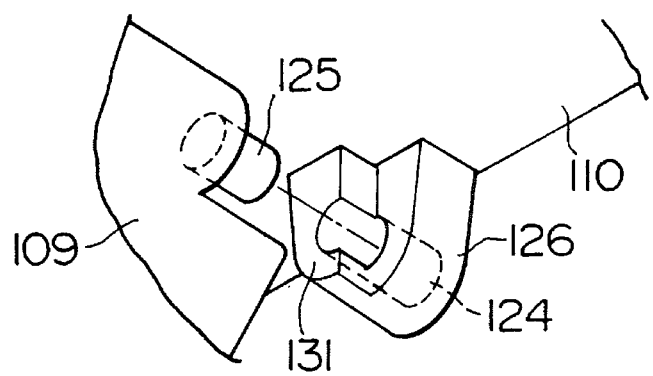
FIG. 16A is an enlarged perspective detail view of a part XVIA in FIG. 16.
Figure 16:
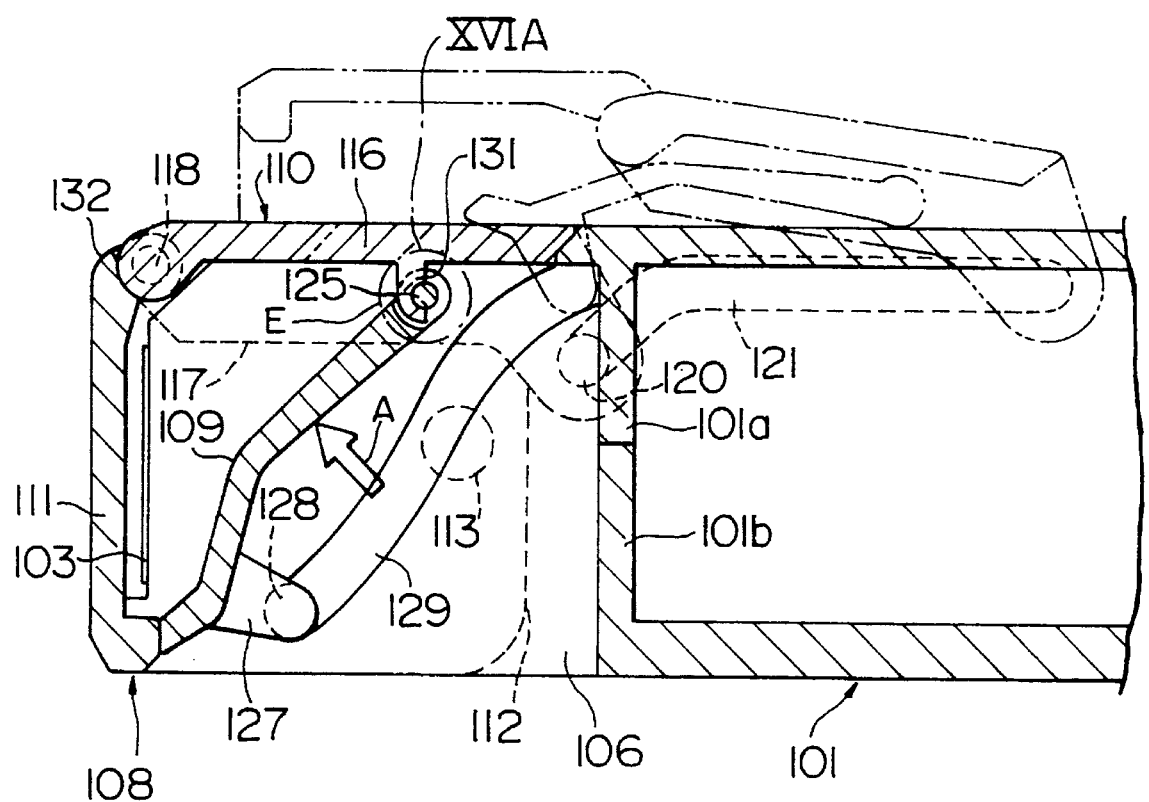
FIG. 16 is a longitudinal side-section view of a modification of the tape cartridge shown in FIG. 9.
Figure 17:
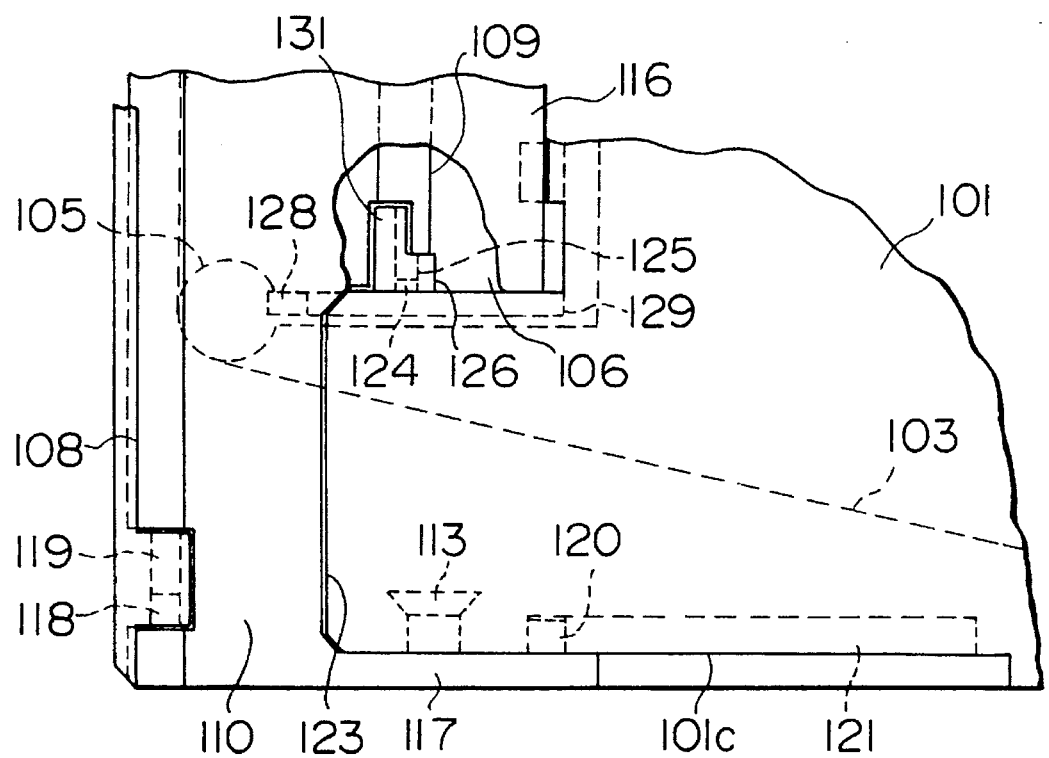
FIG. 17 is a plan view of a part of the cartridge shown in FIG. 16.
Figure 18:
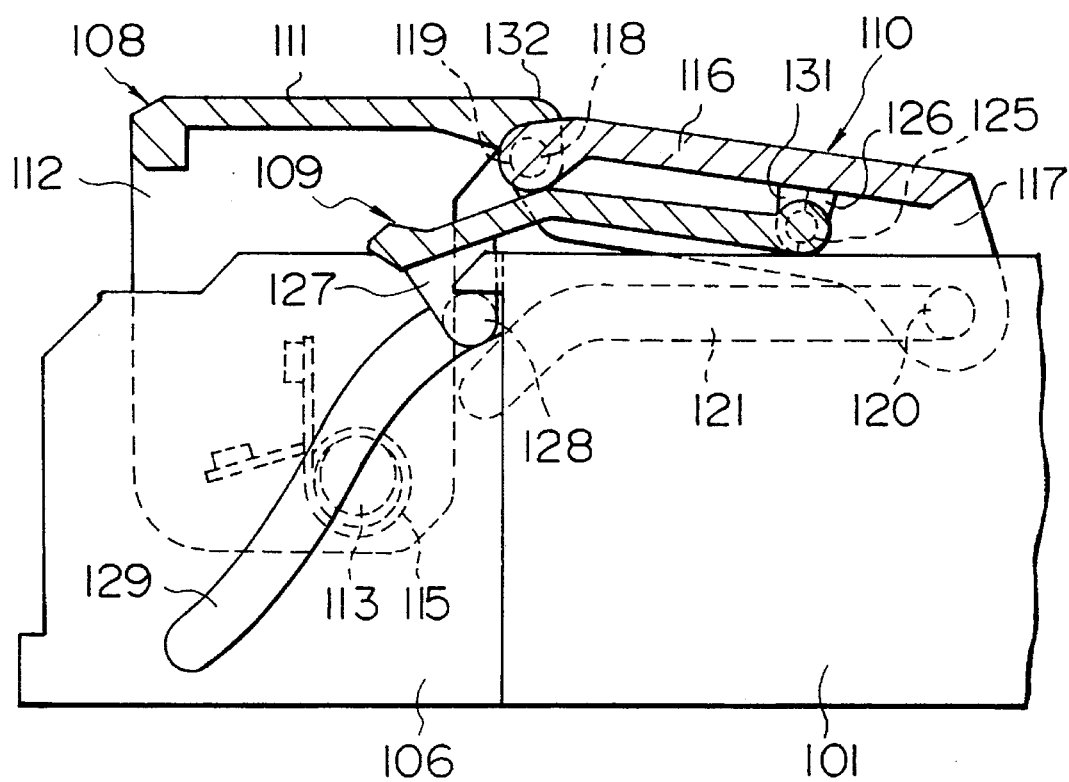
FIG. 18 is a longitudinal side-sectional view, in an open state of three lids, of the cartridge shown in FIG. 16.
Figure 19:
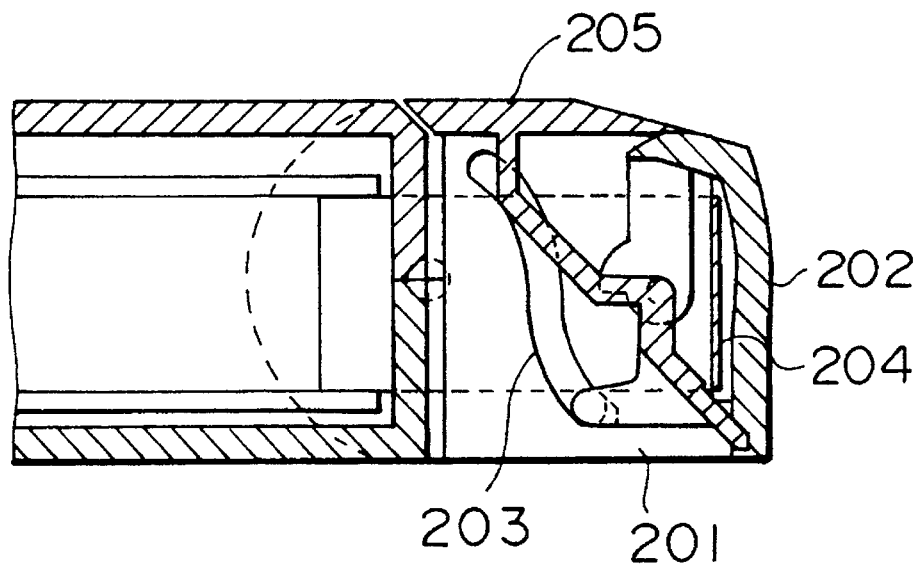
FIG. 19 is a longitudinal side-sectional view, in a lid-closing state, of a part of a conventional 8 mm video tape cartridge.

In FIGS. 16 to 18, components identical or corresponding to those shown in FIGS. 9 to 15 are indicated by the same reference numerals or characters.

In the arrangement shown in FIGS. 16 to 18, bosses 126 are protrusively formed on the inner surface of the upper wall 116 of the upper lid 110 at left and right end positions closer to the rear end of the upper wall 116 so as to face each other, as in the arrangement shown in FIGS. 9 to 15. The connecting pins 125 of the back lid 109 are pivotally fitted in pin holes 124 of the bosses 126 while the wall of the back lid 109 is deformed in a flexural manner, thereby connecting the upper lid 110 and the back lid 109 so that the upper lid 110 and the back lid 109 can move pivotally on each other.

In the lid closing state, the front lid 108 covers the outer side of the tape 103 led out to a front portion of the casing body 101, the upper lid 110 covers the upper side of the pocket 106, and the back lid 109 covers the tape 103 on the back side of the same in the pocket 106.

If, in this state, in the tape cartridge shown in FIGS. 9 to 15, an external force in the direction of the arrow A is applied forwardly and upwardly to the rear surface of the back lid 109 as shown in FIG. 12, there is a risk of the wall of back lid 109 being deformed in a flexural manner until the connecting pins 125 come off the pin holes 124.

In the tape cartridge shown in FIGS. 16 to 18, prevention walls 1 31 are formed on the upper lid 110 to maintain the connected state even in such situation. As shown in FIGS. 16 and 16A, each coming-off prevention wall 131 has a curved wall with C-shaped section. The wall 131 is formed only on a front half portion of a peripheral portion around the pin hole 124.

In the tape cartridge shown in FIGS. 16 to 18, if an external force in the direction of the arrow A acts on the back lid 109 to push the upper lid 110 toward the front end of the casing body 101, there is also a possibility of the connecting pivots 118 coming off the connecting holes of the front lid 108. To minimize this possibility, a stopper wall 132 is further formed on the upper end of the front lid 108 to contact the front end of the upper wall 116 of the upper lid 110. That is, the stopper wall 132 receives the upper wall 116 to prevent the upper lid 110 from being moved in the forward direction of the casing body 101 by an external force applied in the direction of the arrow A.

In the example shown in FIG. 16 to 18, in the portions of the back lid 109 and the upper lid 110 connected to each other, the prevention wall 131 is protrusively formed on the front half of the peripheral portion of each of the pin holes 124 in which the connecting pins 125 are fitted. In this arrangement, even if the connecting pins 125 are urged to come off the pin holes 124 by a flexural deformation of the wall of the back lid wall 109, the connecting pins 125 are received and stopped by the prevention walls 131. Thus, the risk of disengagement of the back lid 109 from the upper lid 110 is reduced so that the durability of the tape cartridge can be improved. Moreover, since the fitting length of the connecting pins 125 and the pin holes 124 need not be excessively increased, the lids 109, 110 can easily be assembled by slightly bending one of the back lid 109 and the upper lid 110.

The prevention walls 131 may have any other cross-sectional shapes, such as the shape of "V" or a trapezoidal shape, instead of the illustrated shape of "C", as long as the forward moment of the pins 125 can be inhibited.

The arrangement may alternatively be such that connecting pins 125 are provided on the upper lid 110 while pin holes 124 are formed in the back lid 109. In such a case, the prevention walls 131 may be provided, for example, on the rear side of the connecting pins 125 in order to inhibit the corresponding movement of the back lid 109 in the direction of the arrow A or a forward direction relative to the upper lid 110.

What is claimed is:

1. A tape recording/reproduction apparatus for performing recording and/or reproduction on and/or from a tape in a tape cartridge including a casing body having in a front portion thereof a pocket for receiving a head of said apparatus when the tape cartridge is loaded in said apparatus, a front lid movably attached to the casing body so as to open and close a front side of the pocket, and an upper lid movably attached to the casing body so as to open and close an upper side of the pocket, in which when the upper lid is in an opening position for opening the upper side of the pocket, the upper lid is positioned above an upper surface of the casing body so that a lower surface of the upper lid faces the upper surface of the casing body through a gap therebetween allowing pressing means for depressing the cartridge to be placed therein, said apparatus comprising:

a recording/reproduction apparatus body having an aperture through which the tape cartridge is inserted; and cartridge transport means for moving the tape cartridge to a predetermined position in said apparatus body by pressing an upper surface of the cartridge inserted in said apparatus body;

said cartridge transport means having a pressing portion adapted to be placed at least partially in the gap between the lower surface of the upper lid in the opening position above the casing body and the upper surface of the casing body to downwardly press the upper surface of the tape cartridge.

2. A tape recording/reproduction apparatus according to claim 1, further comprising a cartridge-supporting tray in said apparatus body to receive the tape cartridge inserted through the aperture of said apparatus body, wherein the pressing portion of said cartridge transport means is adapted to downwardly press the upper surface of the tape cartridge when the tape cartridge is received in said cartridge-supporting tray.

3. A tape recording/reproduction apparatus according to claim 1, wherein said cassette transport means includes elasticity means for elastically performing said downward pressing of the tape cartridge.

4. A tape recording/reproduction apparatus according to claim 3, wherein said pressing portion comprises said elasticity means.

* * * * *